(12) United States Patent
Urushido et al.

(10) Patent No.: US 12,307,762 B2
(45) Date of Patent: May 20, 2025

(54) INFORMATION PROCESSING DEVICE, METHOD, COMPUTER PROGRAM, AND COMMUNICATION SYSTEM

(71) Applicant: Sony Group Corporation, Tokyo (JP)

(72) Inventors: Kohei Urushido, Tokyo (JP); Shun Lee, Tokyo (JP); Kenta Kawamoto, Tokyo (JP); Shohei Yamamoto, Tokyo (JP); Takayoshi Takayanagi, Tokyo (JP); Kazumi Aoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 219 days.

(21) Appl. No.: 17/794,636

(22) PCT Filed: Jan. 4, 2021

(86) PCT No.: PCT/JP2021/000004
§ 371 (c)(1),
(2) Date: Jul. 22, 2022

(87) PCT Pub. No.: WO2021/153159
PCT Pub. Date: Aug. 5, 2021

(65) Prior Publication Data
US 2023/0109408 A1     Apr. 6, 2023

(30) Foreign Application Priority Data
Jan. 31, 2020   (JP) ................................ 2020-014462

(51) Int. Cl.
G06V 20/17      (2022.01)
B64U 20/87      (2023.01)
(Continued)

(52) U.S. Cl.
CPC .............. *G06V 20/17* (2022.01); *B64U 20/87* (2023.01); *G05D 1/1064* (2019.05); *G06V 20/58* (2022.01); *B64U 2101/30* (2023.01)

(58) Field of Classification Search
CPC ....... G06V 20/17; G06V 20/58; G05D 1/1064
(Continued)

(56) References Cited

U.S. PATENT DOCUMENTS

| 11,565,807 B1 * | 1/2023 | Zuckerman | B64F 1/362 |
| 2020/0035110 A1 * | 1/2020 | Priest | G08G 5/0026 |
| 2021/0248913 A1 * | 8/2021 | Nagai | G08G 5/0008 |

FOREIGN PATENT DOCUMENTS

| CN | 102378998 A | * 3/2012 | ........... G06T 7/2006 |
| CN | 107531324 A | * 1/2018 | ........... B64C 39/024 |

(Continued)

OTHER PUBLICATIONS

International Search Report and Written Opinion mailed on Mar. 16, 2021, received for PCT Application PCT/JP2021/000004, filed on Jan. 4, 2021, 9 pages including English Translation.

*Primary Examiner* — Yazan A Soofi
*Assistant Examiner* — Ahmed Alkirsh
(74) *Attorney, Agent, or Firm* — XSENSUS LLP

(57) ABSTRACT

A collision with another moving object is prevented. An information processing device of the present disclosure includes: an imaging unit which acquires image data by capturing an image of an environment including a traveling direction of a moving object; and a control unit which detects another moving object existing in the traveling direction of the moving object on the basis of the image data and performs an action of preventing a collision with the other moving object on the basis of information regarding the other moving object.

19 Claims, 18 Drawing Sheets

(51) Int. Cl.
  *G05D 1/00*  (2006.01)
  *G06V 20/58*  (2022.01)
  *B64U 101/30*  (2023.01)

(58) Field of Classification Search
  USPC .......................................................... 701/3
  See application file for complete search history.

(56) References Cited

FOREIGN PATENT DOCUMENTS

| | | | | |
|---|---|---|---|---|
| JP | 2005050187 A | * | 2/2005 | |
| JP | 2017-45385 A | | 3/2017 | |
| JP | 2018-77754 A | | 5/2018 | |
| JP | 2019-11971 A | | 1/2019 | |
| JP | 2019-28712 A | | 2/2019 | |
| JP | 2019-46272 A | | 3/2019 | |
| JP | 2019-164003 A | | 9/2019 | |
| JP | 7391833 B2 | * | 12/2023 | ............. B64C 39/02 |
| KR | 102292364 B1 | * | 4/2020 | |
| WO | WO-2019093198 A1 | | 5/2019 | |
| WO | WO-2019181899 A1 | | 9/2019 | |
| WO | WO-2019244626 A1 | * | 12/2019 | ........... B64C 39/024 |
| WO | WO-2020027142 A1 | * | 2/2020 | ......... G01C 21/3804 |

* cited by examiner

INFORMATION PROCESSING DEVICE, METHOD, COMPUTER PROGRAM, AND COMMUNICATION SYSTEM

CROSS-REFERENCE TO RELATED APPLICATIONS

The present application is based on PCT filing PCT/JP2021/000004, filed Jan. 4, 2021, which claims priority to Japanese Application No. 2020-014462, filed Jan. 31, 2020, the entire contents of each are incorporated herein by reference.

TECHNICAL FIELD

The present disclosure relates to an information processing device, a method, a computer program, and a communication system.

BACKGROUND ART

In the related art, methods of a drone avoiding an obstacle have been proposed. However, the methods in the related art mainly include collision avoidance with respect to a stationary object and there are few proposals of methods regarding avoidance between drones traveling in a space.

Patent Document 1 discloses a method in which priorities of drones are determined from flight speeds, weights, and the like and each of the drones performs an action for collision avoidance in a priority order according to the determined priorities. In this method, in the case in which a distance between the drones becomes equal to or less than a certain value, the priorities of the drones are compared to determine the priority order of the drones.

However, in order to determine the priority order, the own drone and the counterpart drone need to be able to recognize each other and communicate with each other. In addition, both of the own drone and the counterpart drone need to have a function corresponding to the technique of Patent Document 1.

CITATION LIST

Patent Document

Patent Document 1: Japanese Patent Application Laid-Open No. 2018-77754

SUMMARY OF THE INVENTION

Problems to be Solved by the Invention

The present disclosure provides an information processing device, a method, a computer program, and a communication system which prevent a collision with another moving object.

Solutions to Problems

An information processing device according to the present disclosure includes:
an imaging unit which acquires image data by capturing an image of an environment including in a traveling direction of a moving object; and
a control unit which detects another moving object existing in the traveling direction of the moving object on the basis of the image data and performs an action of preventing a collision with the other moving object on the basis of information regarding the other moving object.

The control unit determines the action of preventing a collision with the other moving object and performs the action.

The control unit may perform, as the action, any one of
traveling while performing an avoidance operation on the other moving object,
performing a standby operation,
traveling without performing an avoidance operation on the other moving object, and
changing a path.

The control unit
may determine whether the moving object or the other moving object has a priority, and
in the case in which the other moving object has a priority, perform any one of traveling while performing an avoidance operation on the other moving object, performing the standby operation, and changing the path, and
in the case in which the moving object has a priority, travel without performing an avoidance operation on the other moving object.

The control unit
may determine a priority of the moving object and a priority of the other moving object, and
determine whether the moving object or the other moving object has a priority on the basis of the priority of the moving object and the priority of the other moving object.

Information regarding the other moving object may include recognition performance of an imaging unit of the other moving object, and
the control unit may determine whether the moving object or the other moving object has a priority on the basis of the recognition performance of the imaging unit and the recognition performance of the imaging unit of the other moving object.

The imaging unit and the imaging unit of the other moving object may include at least one camera, and
the recognition performance of the imaging unit and the recognition performance of the imaging unit of the other moving object may be determined on the basis of at least one of
the number of the cameras,
an angle of view of each of the cameras,
an installation position of the camera, and
a resolution of the camera.

The recognition performance of the imaging unit may be determined on the basis of the number of other moving objects detected using the control unit, and
the recognition performance of the imaging unit of the other moving object may be determined on the basis of the number of moving objects recognized using the other moving object in the traveling direction of the other moving object.

The control unit
may determine whether the other moving object has recognized the moving object; and
in the case in which it is determined that the other moving object has not recognized the moving object, the other moving object may be given priority.

The information regarding the other moving object may include a movement purpose of the other moving object, and
the control unit may determine whether the moving object or the other moving object has priority on the basis of a movement purpose of the moving object and the movement purpose of the other moving object.

The information regarding the other moving object may include movement performance of the other moving object, and the control unit determines whether the moving object or the other moving object has a priority on the basis of the movement performance of the moving object and the movement performance of the other moving object.

The information regarding the other moving object includes a speed of the other moving object, and the control unit determines whether the moving object or the other moving object has a priority on the basis of a speed of the moving object and the speed of the other moving object.

The control unit may calculate a time until the moving object will collide with the other moving object, determine, in accordance with the time, whether the control unit or a base station will determine whether the moving object or the other moving object has a priority, and in the case in which it is determined that the base station will make the determination, transmit a request to the base station to make the determination.

The control unit calculates a time until the moving object collides with the other moving object and determines a type of the information to be acquired on the basis of the time, and the information acquisition unit acquires the information of the determined type.

The information regarding the other moving object includes at least one of a position of the other moving object and a distance from the other moving object.

The moving object is a flying object.

A computer program according to the present disclosure is a computer program to be executed by a computer mounted on a moving object, the computer program including:

an imaging step of acquiring image data by capturing an image of an environment including a traveling direction of a moving object;

a detection step of detecting another moving object existing in the traveling direction of the moving object on the basis of the image data; and a control step of performing an action of preventing a collision with the other moving object on the basis of the information regarding the other moving object.

A method according to the present disclosure is a method performed by a moving object, the method including:

acquiring image data by capturing an image of an environment including a traveling direction of the moving object;

detecting another moving object existing in the traveling direction of the moving object on the basis of the image data; and performing an action of preventing a collision with the other moving object on the basis of information regarding the other moving object.

A communication system according to the present disclosure is a communication system including a plurality of moving objects and a base station, in which each of the plurality of moving objects includes:

an imaging unit which acquires image data by capturing an image of an environment including a traveling direction of the moving object;

a control unit which detects another moving object existing in the traveling direction of the moving object on the basis of the image data; and a communication unit which communicates with the base station, the base station includes:

a communication unit which communicates with the moving object;

an information acquisition unit which acquires information of the moving object and the image data from the moving object; and a control unit which generates information for determining an action of the moving object to prevent a collision with the other moving object on the basis of the information regarding the moving object and the image data and transmits the generated information to the moving object.

MODE FOR CARRYING OUT THE INVENTION

Embodiments of the present disclosure will be described below with reference to the drawings. In one or more embodiments shown in the present disclosure, constituent elements included in each of the embodiments can be combined with each other and the combined result also forms a part of the embodiments shown in the present disclosure.

Figure 1:
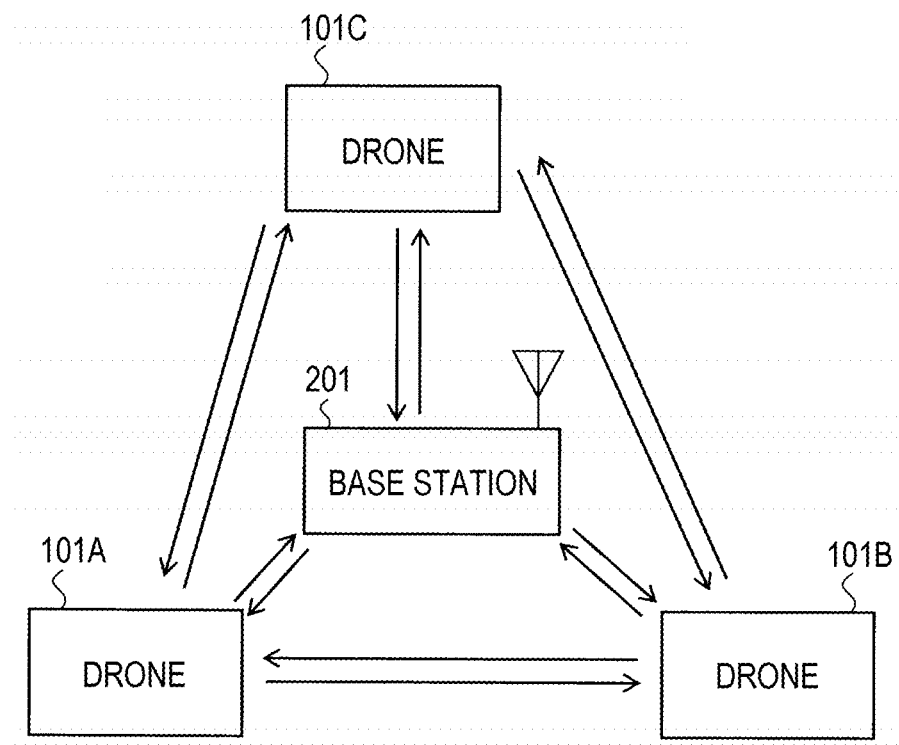
FIG. 1 is a block diagram of a communication system including an information processing device according to a first embodiment.

FIG. 1 is a block diagram of a communication system according to a first embodiment. The communication system of FIG. 1 includes a plurality of moving objects 101A, 101B, and 101C and a base station 201. One of the moving objects in the present embodiment is a drone (unmanned aerial vehicle) and the moving objects 101A to 101C are referred to as "drones 101A to 101C". A drone is an example of a moving object and the moving object may be a robot, an automatic guided vehicle, or the like. Although three drones are illustrated in the drawing, the number of drones may be two or four or more. Hereinafter, one arbitrary drone is referred to as a "drone 101". An arrow in the drawing indicates a communication direction. The drone 101A and the drone 101B can communicate bidirectionally, the drone 101A and the drone 101C can communicate bidirectionally, and the drone 101B and the drone 101C can communicate bidirectionally. Furthermore, the base station 201 can bidirectionally communicate with any of the drone 101A, the drone 101B, and the drone 101C.

The drone 101 is a moving object which can fly by driving a plurality of rotors. The drone 101 can wirelessly communicate with the base station 201. The drone 101 flies along a path under the control of the base station 201. The drone 101 may generate a path by itself from a departure place and a destination place and fly (perform autonomous flight) or may have a designated path from the base station 201 and fly along the designated path.

Figure 2:
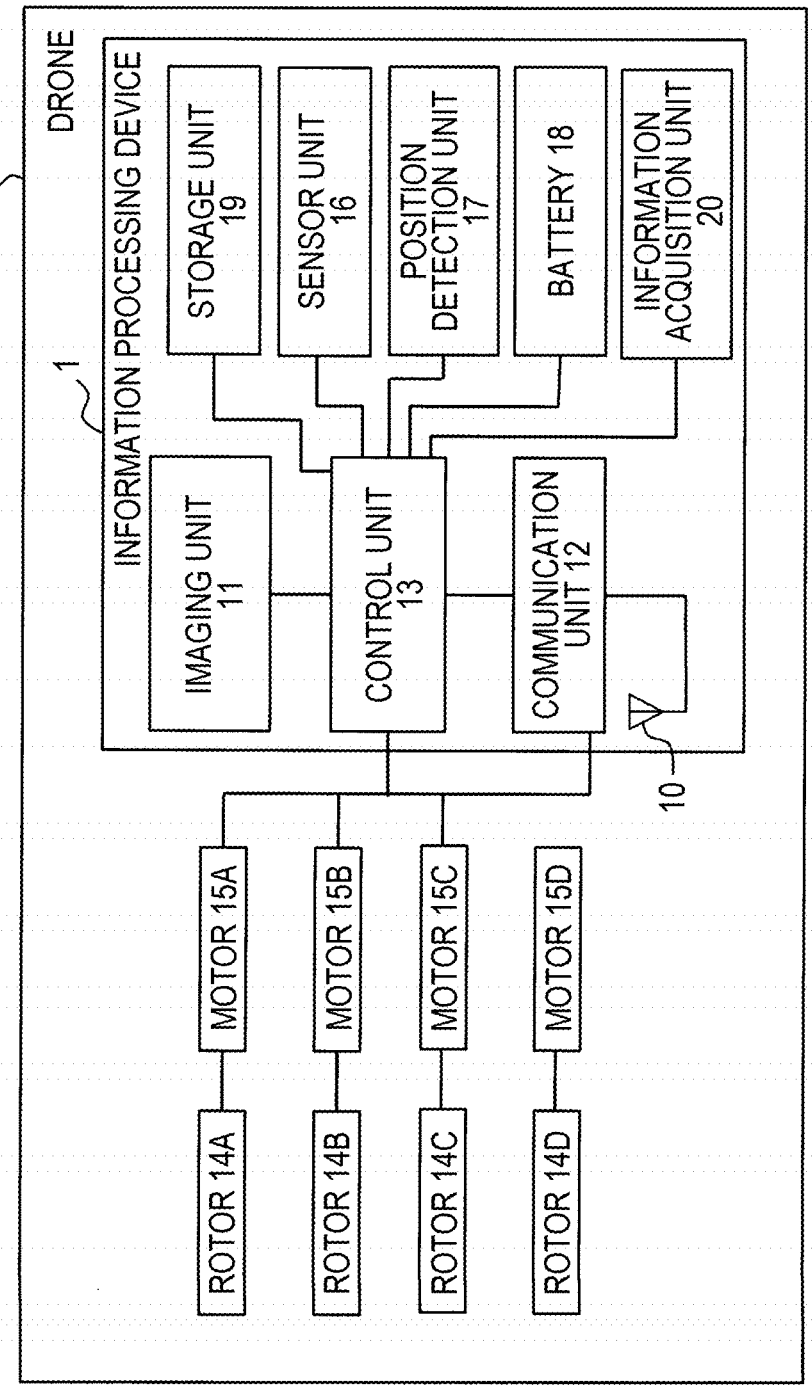
FIG. 2 is a block diagram of a drone.

FIG. 2 is a block diagram of the drone 101. The drone 101 includes an information processing device 1, rotors 14A to 14D, and motors 15A to 15D. The information processing device 1 includes an antenna 10, an imaging unit 11, a control unit 13, a communication unit 12, a sensor unit 16, a position detection unit 17, a battery 18, a storage unit 19, and an information acquisition unit 20.

The imaging unit 11 captures an image of an environment including a traveling direction of the drone 101 and acquires image data. The imaging unit 11 stores the captured image data in the storage unit 19 in association with the time. Alternatively, the imaging unit 11 may provide the captured image data to the control unit 13. The captured image is a still image or a moving image. The imaging device 101 includes one or more cameras including a lens, an imaging element, and the like. The camera may be a stereo camera. The imaging element is, for example, a charge coupled device (CCD) image sensor, a complementary metal oxide semiconductor (CMOS) image sensor, or the like.

The rotors 14A to 14D cause the drone 101 to fly by generating lift by rotation. The rotors 14A to 14D are rotated using the motors 15A to 15D. The motors 15A to 15D rotate the rotors 14A to 14D. The rotation of the motors 15A to 15D is controlled by the control unit 13.

The control unit 13 controls an operation of the drone 101. The control unit 13 controls the imaging unit 11, the communication unit 12, the motors 15A to 15D, the sensor unit 16, the position detection unit 17, the battery 18, the information acquisition unit 20, and the storage unit 19.

The control unit 13 adjusts rotational speeds of the rotors 14A to 14D by adjusting rotational speeds of the motors 15A to 15D. By adjusting the rotational speed of the rotors 14A to 14D, the drone 101 can be moved in an arbitrary direction and at an arbitrary speed.

The control unit 13 controls imaging by the imaging unit 11 during flight. For example, control is performed such that imaging is performed at regular sampling intervals. Furthermore, the control unit 13 controls transmission and reception processing of information or data with other devices (for example, the base station 101 and other moving objects) via the communication unit 12.

The control unit 13 generates a flight path on the basis of a departure place and a destination place of the flight given as instruction data from the base station 201 and controls the flight along the generated path. That is to say, the control unit 13 performs autonomous flight. The control unit 13 has a function of avoiding another drone (hereinafter the other drone) and another obstacle. The control unit 13 may generate a path for preventing collision with an obstacle again in the case in which it is desired to change the path. In addition to the control unit 13 generating a path by itself, the control unit 13 may receive data of a flight path from the base station 201 and control the flight along the path of the received data. In the case in which it is desired to change the path, for example, the control unit 13 may transmit information on a position of the drone 101 and the like to the base station 201 and transmit a request for generating the path again.

The control unit 13 performs processing of detecting another drone existing in the traveling direction of the drone 101 on the basis of the image data captured by the imaging unit 11. The other drone existing in the traveling direction is referred to as an "interfering drone" as a drone which may interfere with the own drone. In addition, processing of detecting an interference drone is referred to as "interference drone detection processing". As an example, the control unit 13 performs the interference drone detection processing every time image data is acquired by the imaging unit 11. The control unit 13 can recognize another drone existing in the traveling direction by detecting the interference drone.

The traveling direction of the drone is, for example, a forward direction of the drone, but is not necessarily limited to the forward direction. For example, in the case in which the drone ascends or descends, an upward direction or a downward direction may be set as the traveling direction.

An example of the interference drone detection processing is performed by detecting an object which is a drone from image data using a segmentation technique. For example, semantic segmentation in which object detection is performed at a pixel level can be used. A drone indicated by the detected object is determined as an interference drone. A method of detecting an interference drone from the image data is not limited to the method in which the segmentation technique is used and may be any method.

A medium (for example, a seal) to which an aircraft ID of the drone 101 is attached may be added to the drone 101. The aircraft ID is an ID uniquely identifying the drone. In the case in which the aircraft ID can be read from the image data, an aircraft ID of the interference drone may be specifically identified from the read information.

As an example, the drone existing in the traveling direction of the drone 101 is a drone shown in a captured image of a camera installed at a location corresponding to the traveling direction of the drone 101 (for example, a location in front of an aircraft). As an example, the entire captured image using the camera is set as an object detection target and the detected object is determined as an interference drone.

Alternatively, a part of the captured image rather than the entire captured image may be set as the object detection target. For example, a specific location (partial image) of the captured image may be set as the object detection target. The specific location may be in a certain range from a center of the captured image. In addition, the specific location may be a portion through which the own drone passes (space portion occupied by the own drone) or a portion obtained by adding a margin region to a space portion occupied by the own drone. Another drone existing in the traveling direction may be detected by another method.

The control unit 13 may perform processing of detecting a drone in a surrounding direction (for example, a rearward direction, a leftward side direction, a rightward side direction, a lower side direction, an upper side direction, and the like) other than the traveling direction. In this case, image data captured by a camera installed at a location other than the location corresponding to the traveling direction may be used. By detecting a drone in a direction other than the traveling direction, it is possible to prevent a collision with another drone, for example, when avoiding an interference drone in the traveling direction.

In the case of detecting the interference drone from the image data, the control unit 13 generates interference detection information including a position and time of the interference drone. The control unit 13 stores the interference detection information in the storage unit 19. A set of the pieces of interference detection information corresponds to a detection history of the interference drone. In addition to the position of the interference drone or instead of the position of the interference drone, a distance from the interference drone may be calculated. The position or distance of the interference drone can be calculated using, for example, image data captured by a stereo camera.

The communication unit 12 performs transmission/reception processing of information or data by performing wireless communication with the base station 101 and another drone (including a case of an interference drone). A method of the wireless communication is arbitrary. For example, a standard may be an IEEE 802.11 standard, an IEEE 802.15.1 standard, or another standard. Frequency bands used for wireless communication are, for example, a 2.4 GHz band, a 5 GHz band, and other frequency bands.

As an example, the communication unit 12 receives instruction data relating to flight from the base station 201. The communication unit 12 provides the instruction data to the control unit 13. The control unit 13 performs control to perform the flight in accordance with the instruction data. As an example, the instruction data includes a departure place and a destination place. The control unit 13 generates a path to a destination place and performs control to perform the flight in accordance with the generated path.

Furthermore, the communication unit 12 receives information regarding the other drone (details will be described later) from the other drone. The communication unit 12 provides the acquired information regarding the other drone to the information acquisition unit 20. The communication unit 12 may acquire information regarding another drone via the base station 101. Furthermore, the communication unit 12 may transmit information regarding the drone 101 (own drone) to the interference drone or the base station 101.

The position detection unit 17 detects the position of the drone 101. As an example, the position of the drone 101 is a current position (real-time position) of the drone 101. The position detection unit 17 detects a position using, for example, a global positioning system (GPS) or the like. The position detection unit 17 stores information of the detected position in the storage unit 19 in association with time. The position detection unit 17 may provide information on the position to the control unit 13.

The position of the drone is, for example, a position in a predetermined coordinate system. The predetermined coordinate system may be a three-axis coordinate system (XYZ coordinate system) in which the position of the base station 101 is an origin or a predetermined position. For example, (X, Y, Z)=(7.3 m, 4.1 m, 15.8 m). The coordinate system may have a point other than the position of the base station 101 as the origin. Alternatively, the position of the drone may be a position on the basis of a latitude and a longitude acquired using a GPS. The position on the basis of a latitude and a longitude may be converted into a position in a predetermined coordinate system.

The sensor unit 16 includes one or a plurality of sensors which acquire a state of the drone 101. Examples of the sensor include an acceleration sensor, an orientation sensor (gyro sensor, GPS compass, electronic compass, or the like), an ultrasonic sensor, and an atmospheric pressure sensor. The sensor unit 16 stores the acquired information indicating the state of the drone 101 in the storage unit 19 in association with the time. The sensor unit 16 may provide the acquired information indicating the state of the drone 101 to the control unit 13.

Examples of the information acquired using the sensor unit 16 include the speed and the traveling direction of the drone. As an example, the traveling direction is represented by a predetermined coordinate system. Alternatively, the traveling direction may be expressed by, for example, an absolute orientation expressed in a range of up to 359.99 toward the east with the true north direction as 0 degrees. The absolute orientation may be converted into a direction in a predetermined coordinate system.

As an example, the imaging unit 11, the sensor unit 16, and the position detection unit 17 operate (imaging, sensing, and position detection) at a constant sampling interval and at the same time under the control of the control unit 13. Here, the sampling interval and the operation time of the operations of the imaging unit 11, the sensor unit 16, and the position detection unit 17 may be different.

The battery 18 stores electric power energy for operating each constituent element in the drone 101. The battery 18 may be a primary battery capable of only discharging or a secondary battery capable of charging and discharging.

The storage unit 19 stores the information (speed, traveling direction, and the like) acquired using the sensor unit 16, the information of the position acquired using the position detection unit 17, the image data acquired using the imaging unit 11, and the interference detection information (the position, the time, and the like of the interference drone) acquired using the control unit 13. The control unit 13 may acquire information on the remaining energy amount of the battery 18 and store the acquired information in the storage unit 19.

In addition, the storage unit 19 stores information regarding attributes and performance of the drone 101. Examples of information regarding the attributes and performance of the drone 101 include the following information.

Aircraft ID
  Flight purpose (movement purpose)
  Flight performance (movement performance)
  Departure place and destination place
  Recognition performance The aircraft ID is an ID uniquely identifying the drone. For example, the aircraft ID includes "ABC 123" and the like. The aircraft ID may include an address for communication according to a used protocol.

Examples of the flight purpose include imaging, life-saving (including rescue), logistics, fire extinguishing, monitoring, and the like. Examples of the imaging include imaging of a vehicle traveling on a road surface on the ground, imaging of a transport vehicle autonomously traveling in a facility, imaging of a ship, and the like. As an example of the life-saving, there is transportation of medical supplies or daily necessities to a disaster-stricken area, an accident site, or the like. An example of extinguishing is the dropping of an extinguishing agent on a fire site. As an example of logistics, there is transportation of cargos. Examples of the monitoring include detection of a suspicious person, abnormality detection of a facility, and the like.

Examples of the flight performance include braking performance and turning performance. As an index of the braking performance, for example, there is a distance (braking distance) from when the control unit issues a stop command (command to stop in the air) to when the drone actually stops. The braking distance depends on the speed of the drone or the strength of the braking (braking force). As an index of the turning performance, for example, there is a minimum rotation radius.

The destination place or the departure place is determined in a predetermined coordinate system as an example. For example, the destination place is (X, Y, Z)=(180 m, 210 m, 1.0 m). The destination place or the departure place may be a position on the basis of a latitude and a longitude acquired using a GPS. In the case in which the drone flies on the same path for the purpose of monitoring or the like, there may be no destination place.

The recognition performance is performance of the ability to detect a drone from image data. Examples of the recognition performance include at least one of the position, the number, the angle of view, and the resolution of the camera installed in the drone. The recognition performance may include the number of other drones recognized by the drone in the traveling direction.

As an example of the position and the number of cameras, only one camera may be installed in front of the drone, or a plurality of (for example, eight) cameras may be installed around the drone. In the case in which only one camera is installed in front of the drone, only in front of the drone can be imaged, and thus only a drone in front can be detected. That is to say, only a drone in front can be recognized. In the case in which a plurality of cameras is installed in the surroundings of the drone, image capturing can be performed not only in front but also in the entire surroundings such as to the rear, and in the left direction, and the right direction so that a drone can be detected over a wide range. That is to say, it is possible to recognize a drone in a wide range.

Furthermore, the narrower the angle of view, the greater the distance over which image capturing can be performed. That is to say, it is possible to recognize a drone which is far away. Here, since the imaging range is narrowed, increasing the number of installed cameras is required to recognize the drone in a wide range as compared with the case of using a camera having a wide angle of view.

If the resolution is high, the drone included in the captured image can be identified with higher accuracy. For example, even if the captured image shows a small drone, the drone can be detected and recognized as an interference drone.

The information acquisition unit 20 acquires information regarding the other drone from the other drone via the communication unit 12. There may be a configuration in which the information acquisition unit 20 acquires information regarding another drone from the base station 101.

As an example, the information regarding the other drone acquired from the information acquisition unit 20 includes the same items as the information in the storage unit 19 of the drone 101. For example, the following items are included.
Aircraft ID
    Flight purpose (movement purpose)
    Flight performance (movement performance)
    Departure place and destination place
    Recognition performance
    Position
    Speed
    Traveling direction
    Remaining energy amount of battery
    Interference detection information (position, detection time, and the like of the interference drone)

[Collision Avoidance Control]

The collision avoidance control according to the embodiment will be described below.

In the case in which one or more interference drones are detected from the image data in the traveling direction of the own drone, the control unit 13 communicates with the interference drone to acquire information regarding the interference drone. The information regarding the interference drone to be acquired is all or a part of the items described above. There may be a configuration in which some or all of the information regarding the interference drone is acquired from the base station 201. Furthermore, the control unit 13 may transmit information regarding the drone 101 to the interference drone or the base station 201 via the communication unit 12.

Communication with the interference drone is performed on the basis of the aircraft ID in the case in which the aircraft ID of the interference drone can be specifically identified from the image data. For example, communication is performed using a packet including the aircraft ID. In the case in which the aircraft ID has not been identified, a directional beam for the position of the interference drone may be formed to perform communication. Alternatively, a packet may be transmitted in broadcast and the interference drone may be identified on the basis of a response packet transmitted from the direction or position of the interference drone.

The control unit 13 determines an action necessary for preventing the collision with the interference drone on the basis of the acquired information regarding the interference drone. The control unit 13 controls the flight of the drone 101 on the basis of the determined action.

Examples of actions necessary for preventing the collision include traveling while avoiding the collision with the interference drone (that is, while performing the avoidance operation), traveling without performing the avoidance operation, performing the standby operation, and changing the path. The standby operation includes a temporary stop on a path or a retreat operation of retracting to a position deviated from the path.

An operation of determining an action to prevent a collision in this manner and performing the determined action is referred to as "collision avoidance control". In the case in which the standby operation is performed, the flight is resumed after the interference is resolved, that is, after the interference drone no longer exists in the traveling direction. In the case in which the temporary stop is performed as the standby operation, the flight is resumed from the place in which the temporary stop is performed. In the case in which the evacuation operation is performed as the standby operation, the flight returns to the original path and continues or a new path is generated again from the evacuated position and the flight is performed along the regenerated path. Details of the collision avoidance control will be described later.

Figure 3:
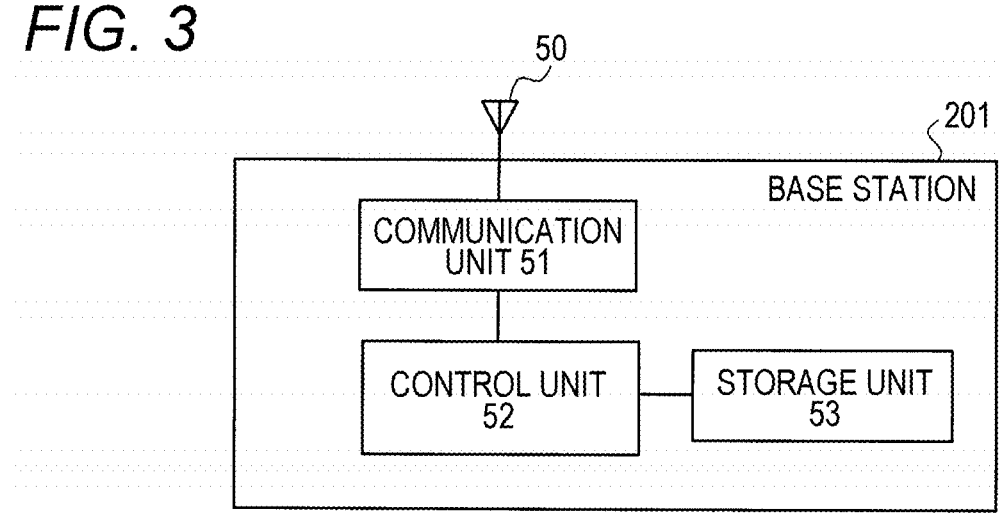
FIG. 3 is a block diagram of a base station.

FIG. 3 is a block diagram of the base station 201. The base station 201 includes an antenna 50, a communication unit 51, a control unit 52, and a storage unit 53.

The communication unit 51 performs transmission/reception processing of information or data by performing wireless communication with the drone 101 (101A to 101C). A method of the wireless communication is arbitrary. For example, the standard may be the IEEE 802.11 standard, the IEEE 802.15.1 standard, or another standard. Frequency bands used for wireless communication are, for example, a 2.4 GHz band, a 5 GHz band, and other frequency bands.

The communication unit 51 acquires instruction data regarding flight from the control unit 52 to the drone 101 and transmits the instruction data to the drone 101.

The storage unit 53 stores information regarding attributes and performance of the drone 101. For example, information regarding an aircraft ID, specification information (model, weight, size, and the like), a flight purpose (movement purpose), flight performance (movement performance), a departure place and a destination place, and recognition performance of the drone 101 is stored.

The control unit 52 controls the operation of the base station 201. Furthermore, the drone 101 is instructed to fly.

The control unit 52 generates instruction data regarding the flight of the drone 101 on the basis of the information regarding the drone 101 in the storage unit 53. The instruction data includes, for example, a departure place and a destination place. As another example, the indication data may include a path of flight. The control unit 52 transmits the generated instruction data to the drone 101 via the communication unit 51.

In the case in which a request for generating a path again is received from the drone 101, the control unit 52 generates the path again. The control unit 52 transmits instruction data including the regenerated path to the drone 101.

The control unit 52 controls transmission and reception of information or data with the drone 101. As an example, the control unit 52 acquires information or data acquired using the sensor unit 16, the control unit 13, and the position detection unit 17 of the drone 101 from the drone 101 and stores the acquired information or data in the storage unit 53.

In the case in which the control unit 52 receives a transmission request of information regarding another drone from the drone 101, the control unit reads the requested information of the drone from the storage unit 53 and transmits the information to the drone 101.

The collision avoidance control performed using the control unit 13 of the drone 101 will be specifically described below.

Figure 4:
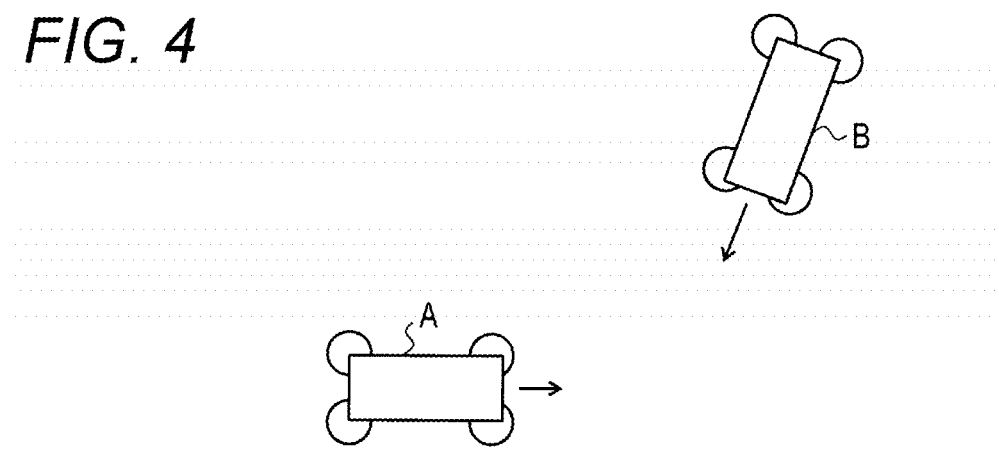
FIG. 4 is a schematic plan view illustrating states during flight of a drone A and a drone B.

FIG. 4 is a schematic plan view illustrating the drone A and the drone B in flight. The drone A is flying in a traveling direction indicated by an arrow and the drone B is flying in a traveling direction indicated by an arrow.

Figure 5:
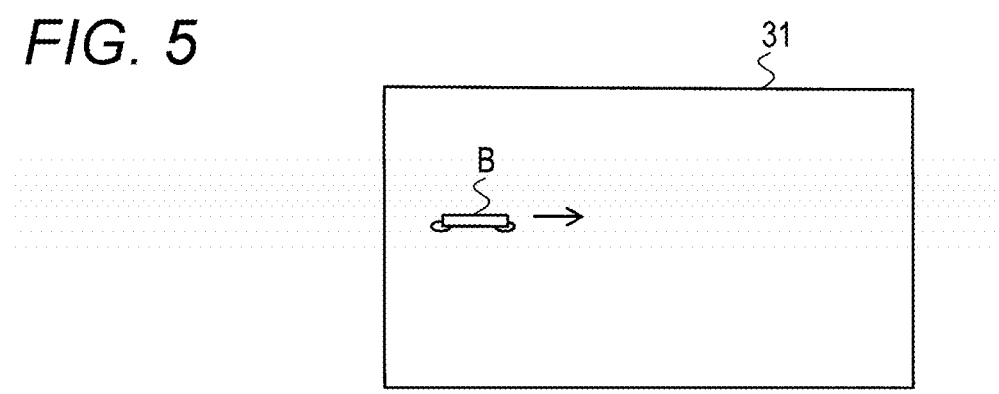
FIG. 5 is a diagram illustrating an example of image data obtained by a camera installed in front of the drone A.

FIG. 5 illustrates an example of image data 31 obtained using a camera installed in front of the drone A. This camera acquires image data in the traveling direction. In the drone A, an object B is detected on a center left side of the image data 31. It is determined that the object B is a drone from a shape of the object B. That is to say, the drone A determines the object B as an interference drone.

Also in the drone B, similarly to the drone A, the drone A may be detected as an interference drone by analyzing image data.

The control unit 13 of the drone 101 determines whether the drone 101 or the interference drone travels preferentially. Here, for the sake of description, the drone 101 is referred to as a "drone A" and the drone B is referred to as an "interference drone".

In the case in which the interference drone has a priority, the drone 101 performs, for example, a standby operation (temporary stop or evacuation to a position deviated from the path) as an operation for preventing a collision with the interference drone. Alternatively, the path is changed. The drone 101 performs an avoidance operation (flies while avoiding the interference drone). Whether the drone 101 or the interference drone has a priority is determined by negotiation between the drone 101 and the interference drone as an example. Alternatively, one of the drones determines, as a master, whether the drone 101 or the interference drone has a priority. Alternatively, as will be described later, there is also a configuration in which the base station 201 determines whether the drone 101 or the interference drone has a priority.

On the other hand, in the case in which the drone 101 has a priority, the drone 101 travels without performing the avoidance operation. That is to say, the drone directly flies along a current path. On the other hand, the interference drone performs a standby operation or an avoidance operation.

Figure 6:
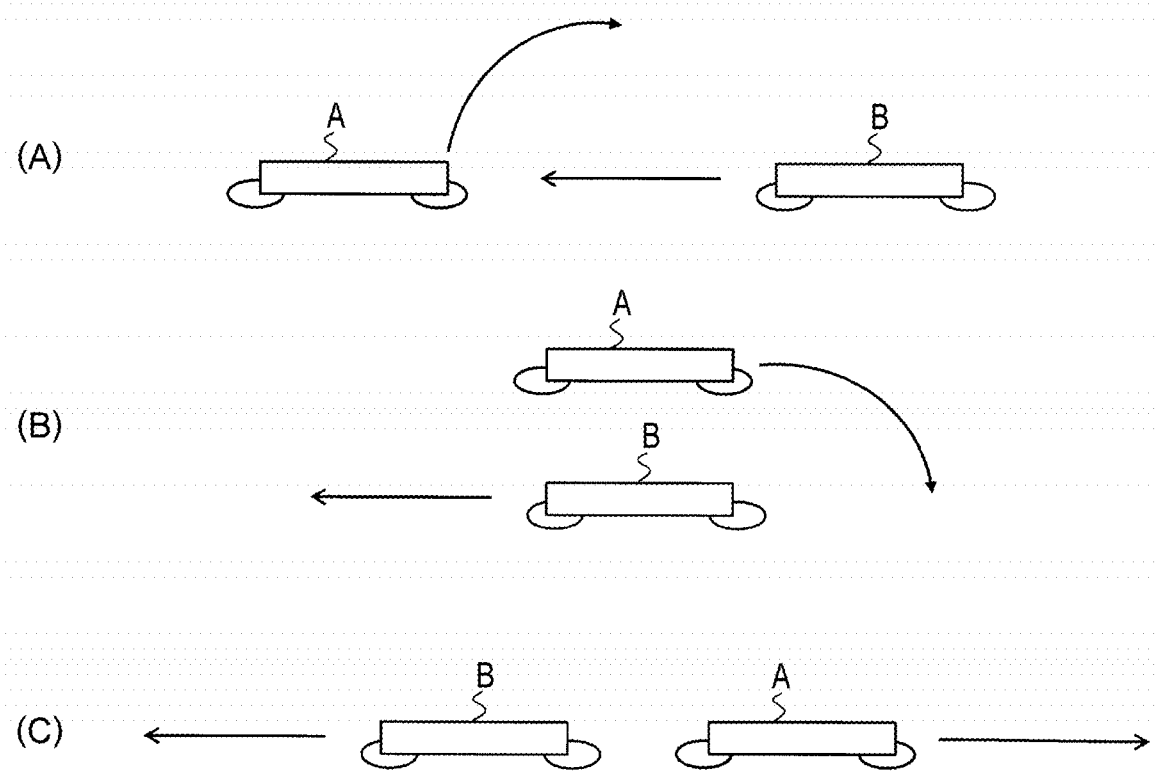
FIG. 6 is a side view illustrating an example of an avoidance operation.

FIG. 6 is a side view illustrating an example of the avoidance operation. In this example, the drone A and the drone B are flying in opposite directions to each other (FIG. 6(A)). It is assumed that drone B has a priority over the drone A. The drone B travels straight along the path. The drone A moves upward while moving forward and avoids the drone B (FIG. 6(B)). After avoiding the drone B, the drone A returns to the original path (FIG. 6(C)). Here, the drone A moves upward to avoid the drone B, but may move downward or may avoid the drone B in the leftward direction or the rightward direction. After avoiding the interference, the drone A may generate the path again without returning to the original path. In other ways, the interference drone B may be avoided.

Figure 7:
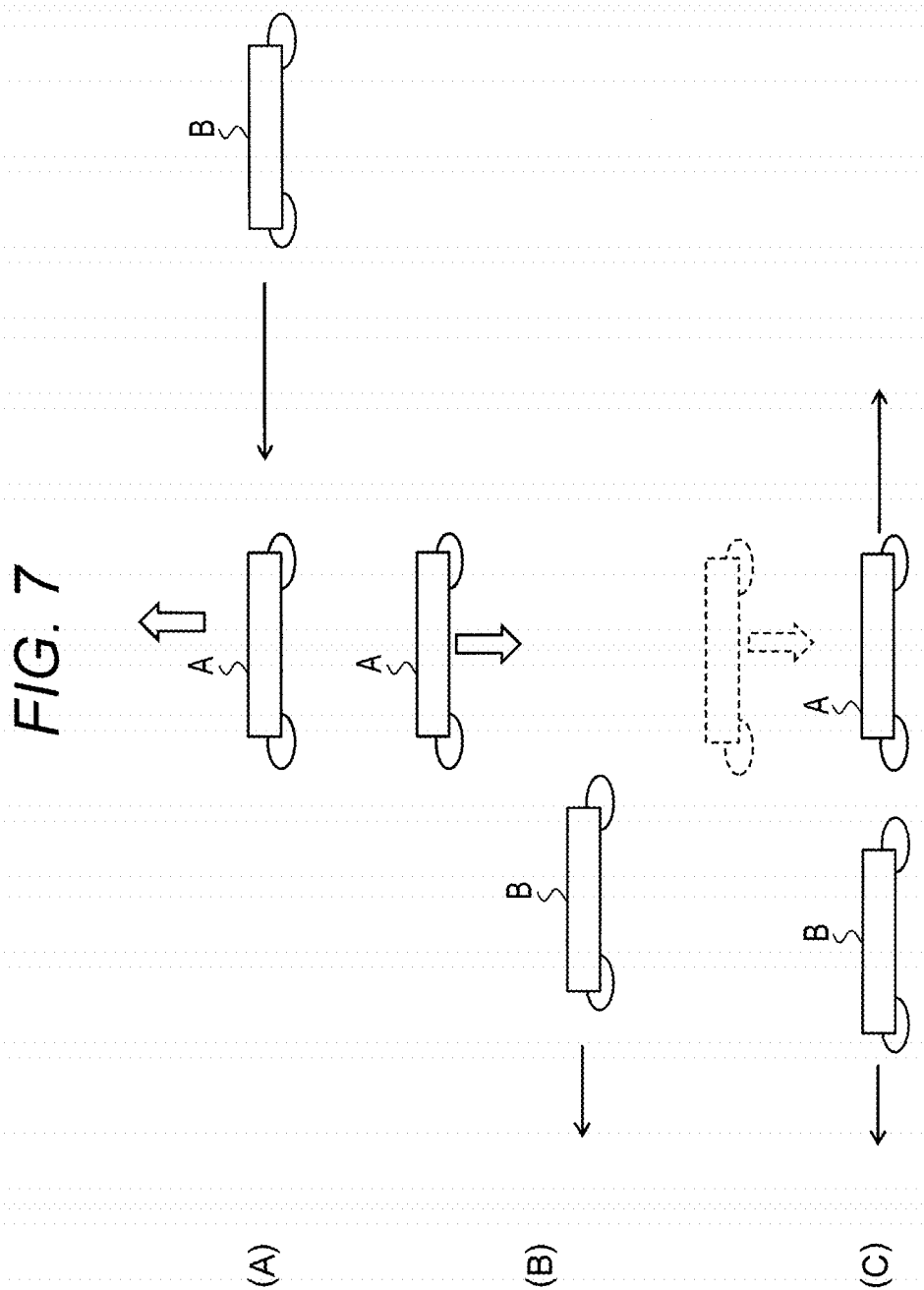
FIG. 7 is a side view illustrating an example of a retreat operation.

FIG. 7 is a side view illustrating an example of the retreat operation. Similarly to FIG. 6, the drone A and the drone B are flying in opposite directions. It is assumed that drone B has a priority over the drone A. The drone B travels straight along the path. The drone A temporarily stops and further moves upward, for example, by 10 m (FIG. 7(A)). The drone A waits until interference with the drone B is avoided. For example, the drone is retracted to a position raised by 10 m. After the interference with the interference drone B is avoided (after the interference drone disappears in the traveling direction of the drone A), the drone A moves downward and returns to the original path (FIG. 7(B)). The drone A resumes flight (FIG. 7(C)). The drone A may generate a new path again at the raised position and switch the path to the regenerated path. Here, the drone A moves upward to avoid the drone B, but may move downward or may move in the leftward direction or the rightward direction.

Figure 8:
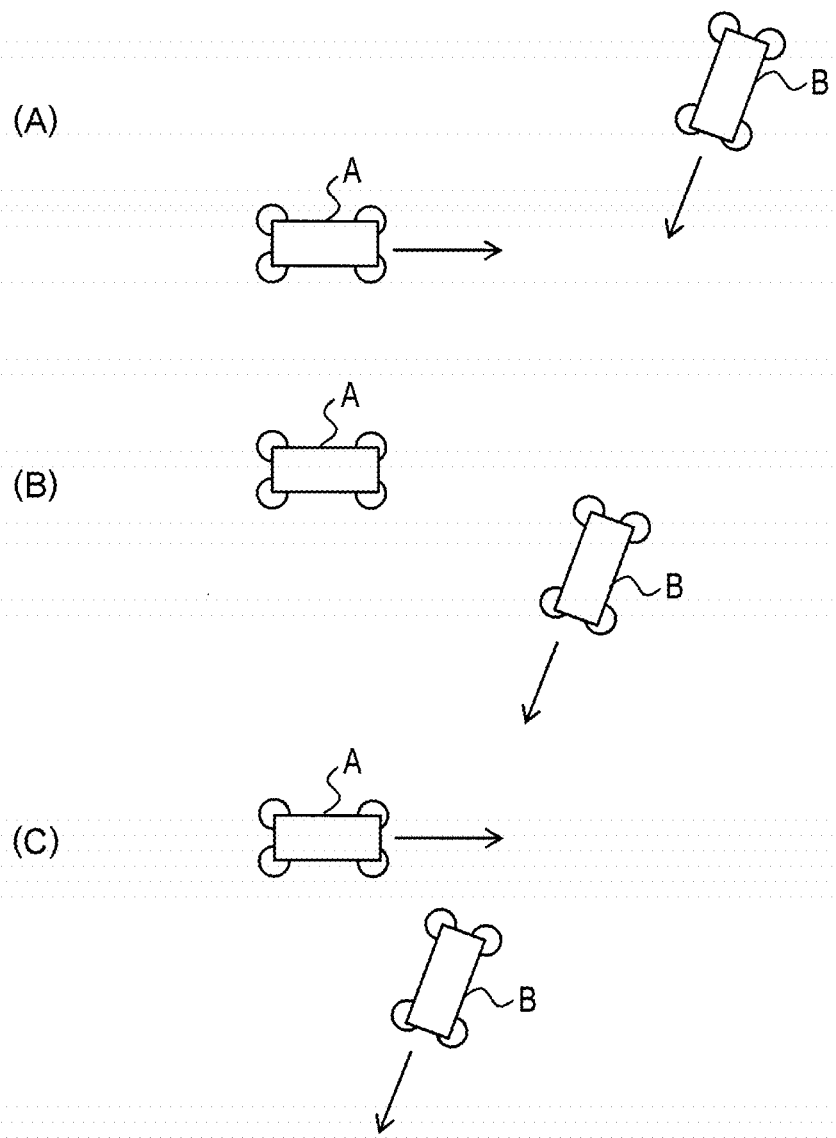
FIG. 8 is a plan view illustrating an example of temporary stop.

FIG. 8 is a plan view illustrating an example of the temporary stop. The drone A and the drone B are each traveling straight along the path (FIG. 8(A)). It is assumed that drone B has a priority over the drone A. The drone A temporarily stops and the drone B travels straight (FIG. 8(B)). After the interference with the interference drone B is avoided (after the interference drone disappears in the traveling direction of the drone A), the drone A resumes the flight from the temporarily stopped position (FIG. 8(C)).

There is a method of using a priority to determine whether the drone 101 or the interference drone has a priority. The control unit 13 of the drone 101 determines the priority of the drone 101 and the priority of the interference drone on the basis of the information regarding the drone 101 and the interference drone. The control unit 13 determines that the drone 101 or the interference drone has a priority in descending order of priority. For example, if the drone 101 has a priority of 2 and two interference drones (interference drones X, Y) have a priority of 1 and a priority of 3, respectively, the interference drone X, the drone 101, and the interference drone Y have a priority in this order. In this case, as an example, the most prioritized interference drone X travels along the path as it is. The drone 101 and the drone Y perform a standby operation. If the interference with the interference drone X is avoided, the drone 101 with the next highest priority resumes flight. The drone Y with the lowest priority resumes the flight if the interference with the interference drone X is avoided. Here, although the drone 101 and the drone Y perform the standby operation as the action of preventing the collision, at least one of the drone 101 and the drone Y may perform the avoidance operation. Alternatively, at least one of the drone 101 and the drone Y may change the path. In this description, the smaller the value, the higher the priority, but the larger the value, the higher the priority. An example of determining a priority will be described below as first to fifth examples.

First Example of Priority Determination

A priority is determined on the basis of recognition performance of the drone 101 and recognition performance of the interference drone. For example, in the case in which the recognition performance of the interference drone is lower than that of the drone 101, the priority of the interference drone is set higher than that of the drone 101. As an example in which the recognition performance of the interference drone is low, there is a case in which the number of installed cameras is smaller than that of the drone 101. In the case in which the drone 101 has a camera(s) installed on other direction than the front part and the interference drone has no camera installed on other direction than the front part, it can be said that recognition performance of the interference drone is lower than that of the drone 101. Furthermore, the recognition performance of the drone 101 and the recognition performance of the interference drone may be compared in accordance with the number of drones recognized in the traveling direction. The larger the number of drones recognized, the higher the recognition performance. The recognition performance may be compared between the drone 101 and the interference drone in other ways. If the avoidance operation or the retreat operation is performed in the case in which the recognition performance is low, there is a possibility of collision with an unrecognized drone (undetected drone), and thus, it is possible to increase the priority of the drone having the low recognition performance and advance the drone preferentially. The recognition performance may be classified into two classes of high and low or three classes of high, middle, and low and the like. For example, in the case in which the number of installed cameras is less than a threshold value, the class is low, and in the case in which the number of installed cameras is equal to or greater than the threshold value, the class is high. In addition, class classification may be performed in accordance with the number of drones recognized in the traveling direction. In the case in which the recognition performance is the same or in the same class, the priority may be determined by negotiation between the drone 101 and the interference drone. At this time, the priority may be randomly determined.

Second Example of Priority Determination

The priority is determined on the basis of the flight purpose of the drone 101 and the flight purpose of the interference drone. For example, in the case in which the flight purposes of the three drones are the life-saving purpose, the imaging purpose, and the logistics purpose, respectively, the priority may be increased in this order. As another example, the priority of the drone for emergency purposes may be highest. Examples of emergency purposes include life-saving purposes or fire extinguishing purposes. In the case in which the flight purposes are the same or in the same category, the priority may be determined by negotiation between the drone 101 and the interference drone.

Third Example of Priority Determination

The priority is determined on the basis of whether the drone 101 is recognized by the interference drone (detected by analysis of image data). Whether or not the drone 101 is recognized by the interference drone can be determined on the basis of the interference detection information of the interference drone as an example. For example, if the position of another drone included in the interference detection information of the interference drone matches the position of the drone 101 or falls within a certain margin, the drone 101 can determine that the interference drone recognizes the drone 101. As another method, in the case in which the aircraft ID of the drone 101 is included in the interference detection information as the aircraft ID of the drone detected using the interference drone, the drone 101 can determine that the interference drone recognizes the drone 101.

Figure 9:
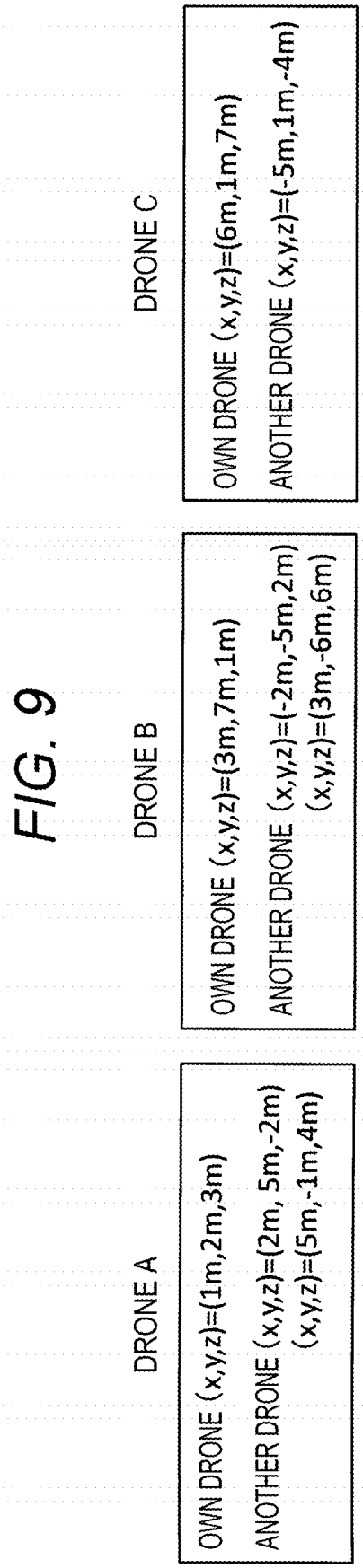
FIG. 9 is a diagram for specifically describing a third example of priority determination.

FIG. 9 is a diagram for specifically describing a third example of priority determination. It is assumed that three drones A, B, and C are flying. In the drawing, the positions of the drones A to C (own drones) and the positions of other drones (interference drones) found by the drones A to C in the traveling direction are illustrated. As an example, the information of FIG. 9 is based on the positions of drones A to C and the interference detection information at the same time (for example, the latest time).

The drone A detects the position of the own drone as (x, y, z)=(1 m, 2 m, 3 m) and detects the relative positions of the two other drones from the own drone as (x, y, z)=(2 m, 5 m, −2 m) and (5 m, −1 m, 4 m). That is to say, the drone A recognizes two other drones. Note that the aircraft IDs of the two drones may not be known at this point.

Similarly, the drone B detects the position of the own drone and the relative positions of the two other drones from the own drone. The drone C also detects the position of the own drone and the relative position of one other drone from the own drone. The drone C recognizes only one of the drones A and B and does not recognize the other (overlooked).

The relative position (2 m, 5 m, −2 m) of the other drone detected using the drone A corresponds to the relative position (−2 m, −5 m, 2 m) of the other drone detected using the drone B. Therefore, the drone having the relative position (2 m, 5 m, −2 m) detected using the drone A can be determined as the drone B. The aircraft ID of the drone B may be specifically identified by communicating with the drone B or may be specifically identified by inquiring the base station 201 about the aircraft ID of the drone existing at the position of the drone B. Similarly, a drone having a relative position (5 m, −1 m, 4 m) detected using the drone A can be determined as the drone C.

Similarly, in the case of the drone B, the drone having the relative position (−2 m, −5 m, 2 m) detected using the drone B can be determined as the drone A. On the other hand, the drone (drone C) existing at the relative position (3 m, −6 m, 6 m) detected using the drone B does not detect another drone at the position of the drone B. Therefore, it can be determined that the drone B is not recognized by the drone (drone C) existing at the relative position (3 m, −6 m, 6 m).

Similarly, the drone having the relative position (−5 m, 1 m, −4 m) detected using the drone C can be determined as the drone A. However, the drone C does not recognize the drone at the position of the drone B.

The drones A to C communicate with each other and determine a priority. Even if the drone C cannot recognize the drone B (even if the drone B is not shown in the camera of the drone C), there may be a case in which the drone C can communicate with the drone B through communication serving as a trigger from the drone B. However, even if the drone C can communicate with the drone B, since the drone C cannot recognize the drone B with the camera, the drone C treats the drone B as not being recognized. The drone C does not recognize the drone B and determines the highest priority 1 as having the lowest recognition performance. That is to say, if the drone C is caused to perform a retreat operation, an avoidance operation, or the like, the drone C cannot recognize the drone B (for example, the angle of view is narrow and the drone B is not captured in the camera) and may collide with the drone B. Since the drone A and the drone B can recognize each other, the priority may be determined using the first or second example of the priority determination described above or the fourth or fifth example which will be described later. Alternatively, the priority may be determined randomly.

Fourth Example of Priority Determination

The priority is determined on the basis of the flight performance of the drone 101 and the flight performance of the interference drone.

For example, the priority is determined on the basis of the highest altitude at which the drone 101 can fly and the highest altitude at which the drone can fly with the interference drone. As an example, a drone having a lower highest altitude has a higher priority. This is because the drone with the higher highest altitude can avoid other drones by moving upward the drone to a higher altitude position, and there are more action options for avoidance. In the case in which the flight performance is the same or equivalent, the priority may be determined by negotiation between the drone 101 and the interference drone. Alternatively, the priority may be determined randomly.

At this time, the priority may be determined on the basis of whether there is a retractable space above the drone 101 and the interference drone. As a premise, it is assumed that both of the drone 101 and the interference drone have performance in which the drone further rises from the current position. In the case in which there is still another drone or another obstacle above the drone 101 and the interference drone, it is determined that there is no space which is retractable above the drone 101 and the interference drone. The priority of drones with a retractable space is lower than that of drones without a retractable space.

As another example, the priority is determined on the basis of the braking performance of the drone 101 and the braking performance of the interference drone. This is because it takes a long time for a drone with low braking performance to stop after the stop order is issued. In this case, a high priority is determined for a drone with low braking performance and a low priority is determined for a drone with high braking ability. The drone with high priority travels without changing the speed and the drone with low priority waits temporarily and waits for the drone to pass ahead so that the collision can be prevented.

As another example, the priority is determined on the basis of the turning performance of the drone 101 and the turning performance with the interference drone. Since a minimum turning radius is smaller as a turning performance is higher, in the case in which the evacuation operation or the avoidance operation is performed by the direction change, unnecessary movement at the time of the direction change is reduced, and the possibility of collision with another drone can be reduced.

The flight performance used to determine the priority is not limited to the above example and other performance may be used.

Fifth Example of Priority Determination

The priority is determined on the basis of the speed of the drone 101 and the speed of the interference drone. For example, in the case in which the speed of the drone 101 is faster than that of the interference drone, the priority of the drone 101 is set higher than that of the interference drone. This is because a drone with a higher speed usually requires a longer time to stop. Here, the time required from the issuance of the stop command to the stop may be calculated on the basis of the braking performance of both drones and the priority of the drone with long time may be set higher than that of the drone with short time.

The first to fifth examples of priority determination are merely examples and two or more of the first to fifth examples may be combined. In addition, as long as the information regarding the drone 101 and the interference drone is used, the priority may be determined through another method.

Figure 10:
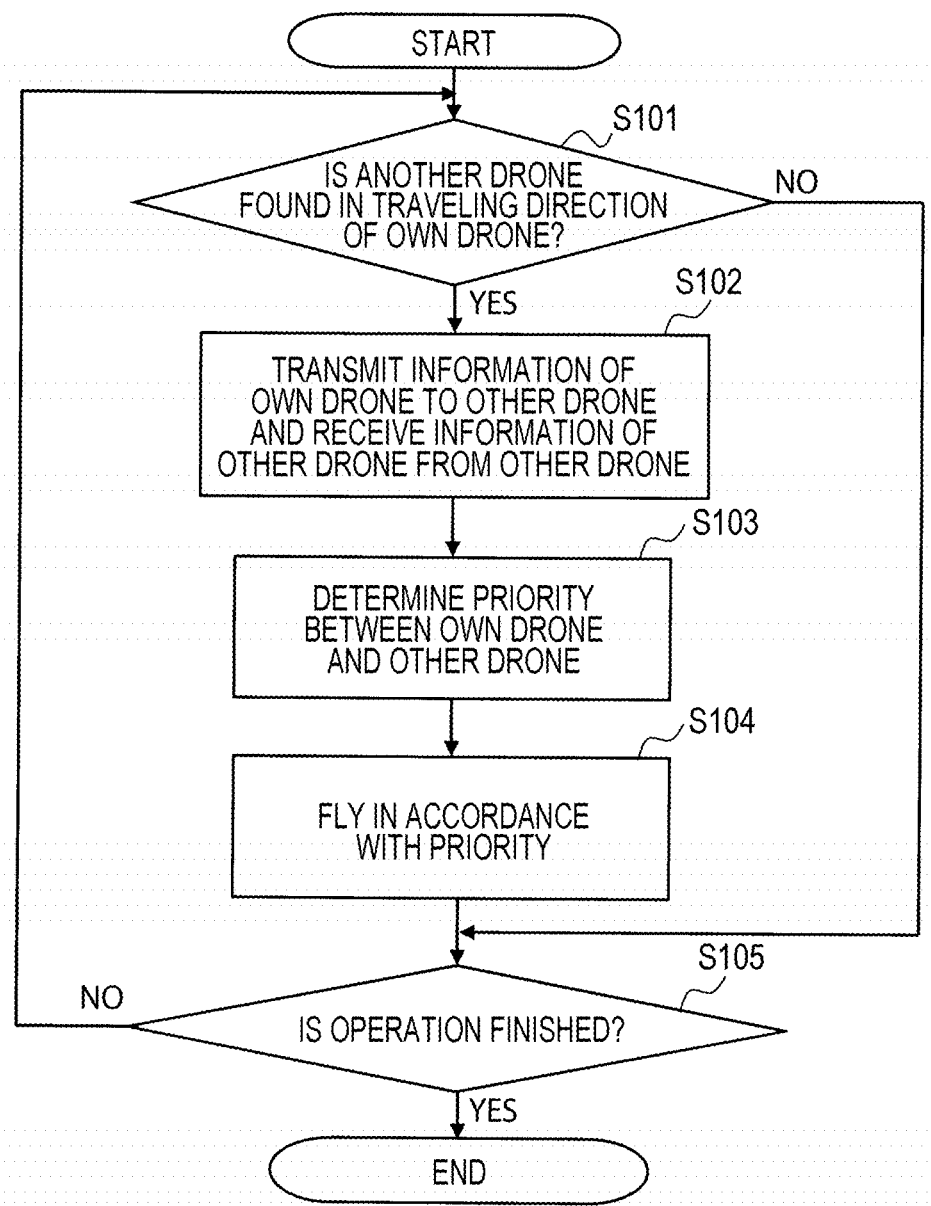
FIG. 10 is a flowchart for describing an example of collision avoidance control performed by a control unit of a drone.

FIG. 10 is a flowchart for describing an example of collision avoidance control performed using the control unit 13 of the drone 101.

On the basis of the image data acquired using the imaging unit 11, it is determined whether another drone (interference drone) has been found in the traveling direction of the drone 101 (S101). If no other drone is found (NO), the process proceeds to the process of Step S105.

In the case in which one or more other drones are found, the communication unit 12 communicates with the other drones to transmit information regarding the drone 101 (own drone) to the other drones (S102). A method of communicating with another drone is as described above. Furthermore, the control unit 13 receives information regarding another drone from the other drone via the communication unit 12 (S102).

Priority is determined between the own drone and the other drone (S103). As an example, the priorities of all of the drones (the own drone and the other drone) are determined while negotiating between the own drone and the other drone. As another method, the priorities of all the drones (the own drone and the other drones) may be determined for each drone. If both of the own drone and the other drone have the same information and the priority is determined by the same algorithm, the priorities of all of the drones determined using each drone are the same.

Furthermore, as another method, one of the own drone and the other drone may determine the priorities of all of the drones as the master. The master transmits information on the determined priority to the other drone. As an example, the drone serving as the master is a drone which recognizes the largest number of other drones or a drone on which an arithmetic device having the highest arithmetic performance is mounted. In the case in which the drone 101 (own drone) becomes the master, the own drone determines the priorities of all of the drones. In this case, in the case in which there is another drone with which communication is not possible, the drone 101 may transmit the priority information to the other drone via the base station 201 or another drone.

It is assumed that one of the other drones is recognized using the own drone and the other drone, but the one other drone does not recognize the own drone and the other drone and cannot perform communication. In this case, the highest priority is determined for the one other drone between the own drone and the other drone. The priority information is not transmitted to the one other drone. The one other drone travels in the traveling direction as it is, for example, as a drone with the highest priority.

The drone 101 flies in accordance with the priority determined in Step S103 (S104). More specifically, an action to prevent the collision (for example, traveling as it is, avoidance operation, or standby operation) is determined on the basis of the priority of each of the drones and the determined action is performed. Details of this Step S104 will be described later.

In subsequent Step S105, it is determined whether to end the operation. For example, in the case in which the drone 101 lands, it is determined to end this operation. In the case in which it is determined to end this operation (YES), the operation is finished. Otherwise, the process returns to the process of Step S101. In the case in which the flight is started again after the operation is finished, the processing of the flowchart of FIG. 10 is started again.

Figure 11:
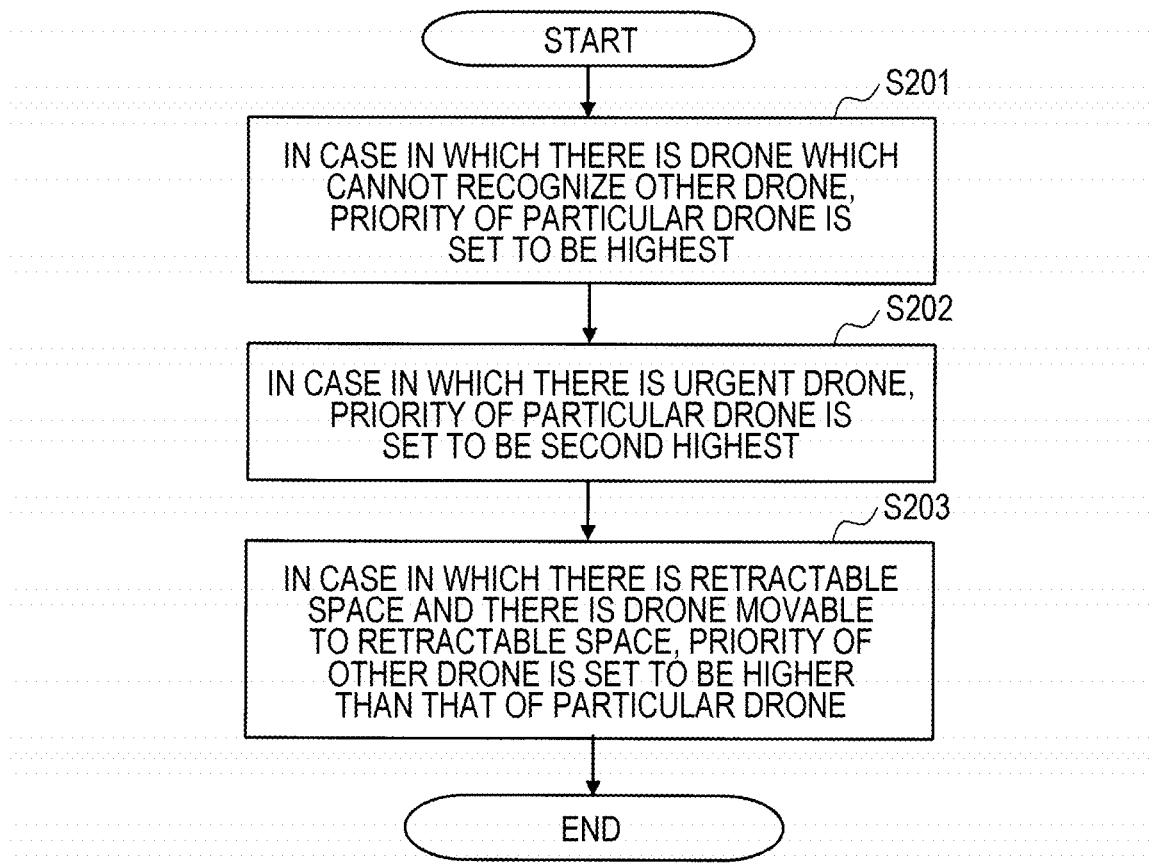
FIG. 11 is a flowchart for describing an example of priority determination processing performed by a control unit of a drone.

FIG. 11 is a flowchart for describing an example of priority determination processing performed in Step S103 of FIG. 10 in the control unit 13 of the drone 101.

In the case in which there is a drone (referred to as "drone X") which cannot recognize other drones among one or more drones discovered by the drone 101, the priority of drone X is set to be the highest (S201). For example, the priority level is set to 1. In the case in which the drone X cannot recognize the other drone but can communicate with the other drone, the priority of the drone X may be set to the highest in the negotiation between the drones including the drone X. In the case in which the drone X cannot communicate with other drones, the priority of the drone X is determined to be the highest priority in the negotiation between drones other than the drone X. In the case in which the drone other than the drone X is only the drone 101, the drone 101 may determine the priority of the drone X as the highest priority. In the case in which the drone X cannot communicate with another drone, information is not transmitted to the drone X. The drone X travels in the traveling direction as it is.

Subsequently, the flight purpose of the drone 101 and the flight purpose of another drone are compared to determine whether there is a drone for emergency purpose (S202). The emergency purpose is, for example, a life-saving purpose or a fire extinguishing purpose. In the case in which there is a drone for emergency purpose, the priority of the drone is set to be the second highest after the drone specifically identified in Step S201 (S202). If the drone is not identified in Step S201, the drone identified in Step 202 has the highest priority. In the case in which there is a plurality of drones for emergency purposes, a priority is determined by negotiation between the drones. Alternatively, the priority may be determined in a more detailed classification such as a life-saving purpose or a fire extinguishing purpose. Although different priorities are set for each of the drones in the embodiment, it is not excluded that the same priority is set for a plurality of drones.

Subsequently, on the basis of the flight performance of the drone 101 and the flight performance of other drones, it is determined whether there is an airspace in which the drone is retractable (for example, an airspace in which an obstacle does not exist 3 m above the position of the own drone) and whether there is a drone which can move in the airspace (S203). In the case in which the drone exists, a priority next highest to the priority of the drone specifically identified in Steps S201 and S202 is determined for the drone (S203).

The flowchart of FIG. 11 illustrates an example in which the priority is determined on the basis of the presence or absence of recognition for another drone, the flight purpose, and the flight performance. This example is merely an example, and as shown in the first to fifth examples of priority determination described above, it is also possible to determine the priority by additionally or alternatively using other information.

Details of Step S104 in FIG. 10 will be described. In Step S104, an action of each drone is determined in accordance with the priority determined in Step S103 and the determined action is performed (collision avoidance control).

First Example of Collision Avoidance Control

It is assumed that there is no space in which two or more drones can pass each other in the traveling direction of each drone. In this case, the drones are caused to fly one by one. First, the drone with the highest priority flies as it is in the traveling direction. The second and subsequent priority drones continue the standby operation until there is no drone with next higher priority in the traveling direction. Whether to perform the temporary standby (refer to FIG. 8) or the evacuation operation (refer to FIG. 7) is as the standby operation may be determined by determining whether the drone collides with the own drone on the basis of the traveling direction of the drone with a higher priority. For example, in the case in which there is no collision, the drone temporarily stands by, and in the case in which there is a possibility of collision, the drone is evacuated to an airspace in the sky or the like.

The second and subsequent priority drones start the flight again in the traveling direction if the drone with next higher priority does not exist in the traveling direction. Specifically, in the case in which the drone is temporarily on standby, the drone starts flying in the traveling direction from the position (refer to FIG. 8). In the case in which the evacuation operation has been performed, the drone returns to the original path and starts flight (refer to FIG. 7). Alternatively, a new path may be generated to start the flight again.

As an example, the determination concerning whether or not the drone with next higher priority no longer exists in the traveling direction is made on the basis of the image data acquired by the imaging unit 11. Alternatively, the determination may be made by receiving information having a notification concerning that interference has been avoided (that is, that another drone does not exist in the traveling direction) from a drone with next higher priority. The notification may be received from the base station 201.

As described above, each of the drones can fly without colliding with each other.

Figure 12:
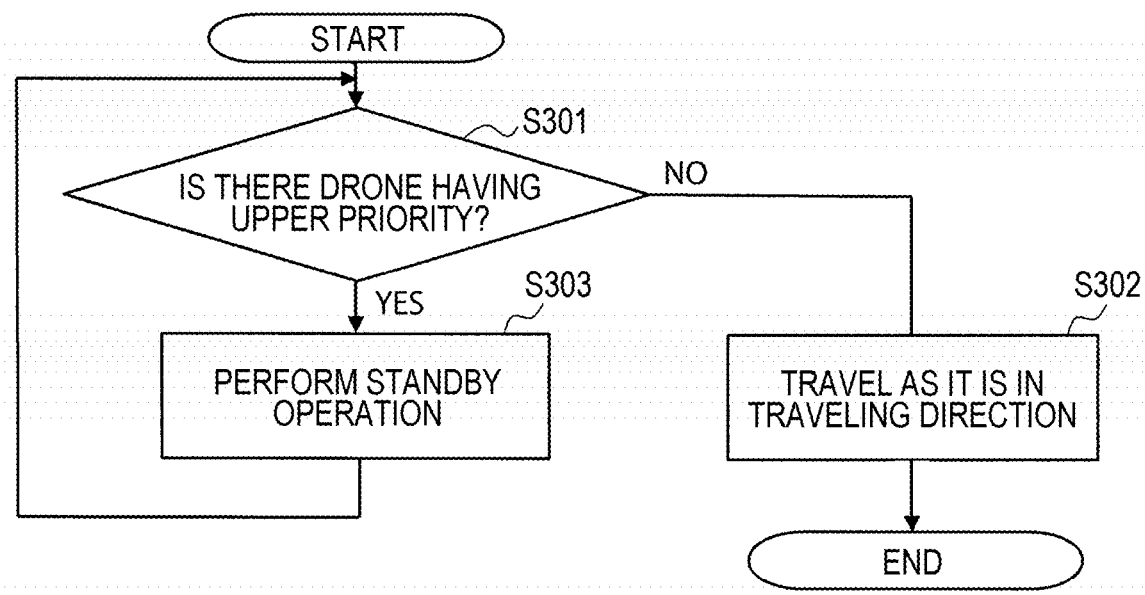
FIG. 12 is a flowchart for describing a first example of collision avoidance control.

FIG. 12 is a flowchart for describing a first example of the collision avoidance control performed using the control unit 13 of the drone 101. Whether there is a drone with a priority higher than the priority of the drone 101 is determined (S301). In the case in which the drone does not exist (NO), the drone 101 travels in the traveling direction (S302).

In the case in which the drone exists (YES), the drone 101 performs a standby operation (S303). For example, if the drone 101 is on the path, in the case in which there is a possibility that a drone with a higher priority than the drone 101 collides with the drone 101, the drone is evacuated to an airspace such as in the sky. In the case in which there is no such possibility, the drone temporarily stops on the current path. Also in the case in which the drone 101 cannot retreat to an airspace in the sky or the like due to flight performance, the drone temporarily stops on the current path. In this case, in the case in which there is a possibility that a drone with a high priority collides with the own drone 101, it is expected that the drone avoids the own drone 101 (refer to FIG. 6).

The processing waits until there is no drone with higher priority than the drone 101 in the traveling direction (S303). In the case in which the drone does not exist (NO in S301), the drone 101 starts the flight again in the traveling direction (S302). If starting the flight again, the drone 101 may transmit information having a notification concerning that interference has been avoided or the like to a drone with a priority lower by one.

Second Example of Collision Avoidance Control

In the case in which there is a space in which a plurality of drones can pass each other in the traveling direction of each of the drones is assumed. Here, it is assumed that there is a space in which three drones can pass each other. In this case, up to three drones can fly while autonomously avoiding collision even if they are caused to fly in the direction at the same time. The numbers of drones which can pass each other may be set in advance in association with map data or the base station 201 may transmit information on the number of drones which can pass each other to each drone.

Figure 13:
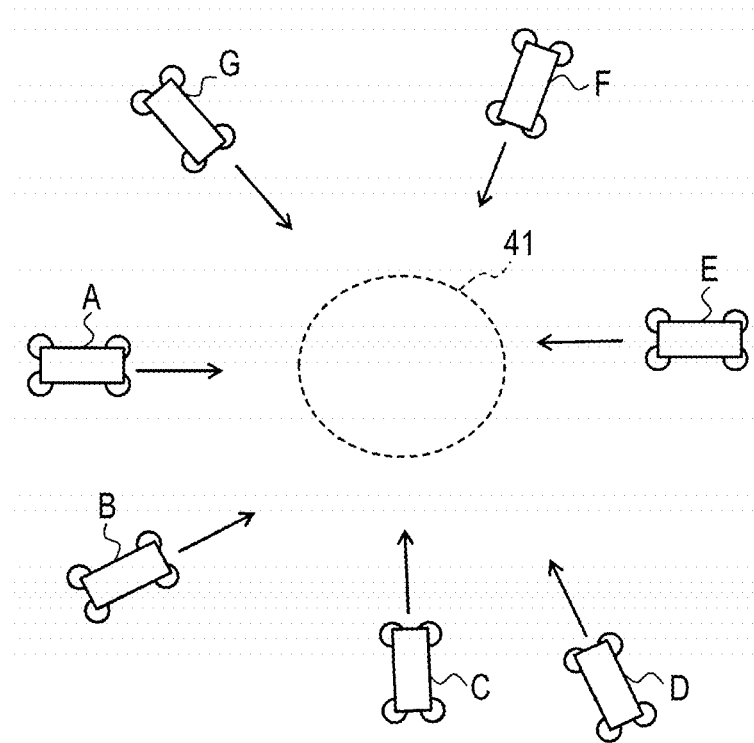
FIG. 13 is a diagram for explaining a second example of the collision avoidance control.

FIG. 13 is a diagram for explaining the second example of the collision avoidance control. There are seven drones A to G. In the traveling direction of the drones A to G, if there are three drones, there is a space 41 in which the drones can cross.

First, the top three drones (for example, drones A to C) are grouped into one group in descending order of priority. The three drones A to C in the group travel in parallel in the traveling direction. At this time, among the drones A to C, a drone with the highest priority (for example, drone A) travels without performing an avoidance operation with respect to another drone (drone B, C), and the drones B and C fly while performing an avoidance operation with respect to the drone A with the highest priority and one of the drones (C or B).

Subsequently, the top three drones (for example, drones D to F) are grouped into one group in descending order of the fourth and subsequent priorities. The drones D to F of the second group continue the standby operation (temporary standby or evacuation operation) until the drones A to C belonging to the first group do not exist in the traveling direction. If the drones A to C of the first group do not exist in the traveling direction, the drones D to F of the second group resume the flight (travel) along the respective traveling directions. At this time, among the three drones, the drone with the highest priority (for example, drone D) travels without performing an avoidance operation with respect to another drone (drone E, F), and the drones E and F fly while performing an avoidance operation with respect to the drone D with the highest priority and one of the drones (F or E).

Thereafter, similarly, three drones are simultaneously flown as one group. In the example of FIG. 13, since the number of the last drones is one (drone G), the drone G travels in the traveling direction as it is. Although three drones are included in one group in this example, the number of drones included in the group may be less than three in accordance with flight performance, interference recognition performance, and the like of the drones.

In the example of FIG. 13, a plurality of drones included in the group is caused to fly simultaneously. In the case in which a drone having low turning performance or a drone having low recognition performance exists as the second or subsequent drone in the group, the drone may be caused to perform a standby operation until another drone avoids interference.

As described above, each of the drones can fly without colliding with each other.

Figure 14:
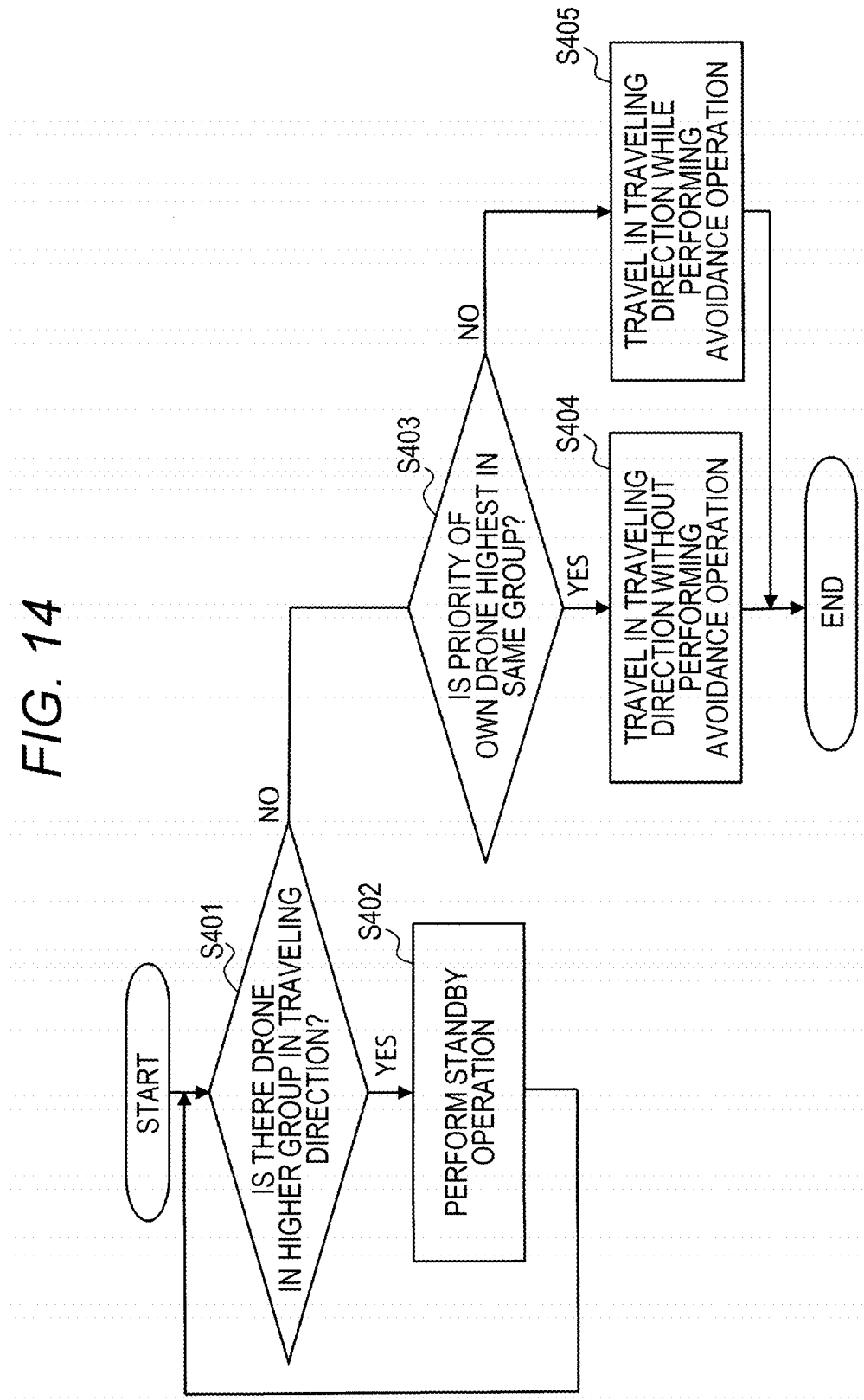
FIG. 14 is a flowchart for describing the second example of the collision avoidance control.

FIG. 14 is a flowchart for describing the second example of the collision avoidance control performed by the control unit 13 of the drone 101. The same description as in FIG. 12 will be appropriately omitted.

Whether a drone in a group higher than the group to which the drone 101 belongs exists in the traveling direction is determined (S401). In the case in which the drone exists (YES), the drone 101 performs a standby operation (S402). In the case in which it is determined that the drone does not exist (NO), the priority order of the drone 101 in the group is determined (S403). In the case in which the priority of the own drone is the highest (YES), the drone travels in the traveling direction without performing the avoidance operation (S404). Otherwise, the drone travels in the traveling direction while performing the avoidance operation (S405). A target of the avoidance operation is another drone in the same group and a drone in another group on standby.

Third Example of Collision Avoidance Control

The priority of each of the drones is adjusted on the basis of the recognition performance of each of the drones. An action of each drone is determined on the basis of the adjusted priority. The adjustment of the priority and the action of each drone may be determined by negotiation between the drones or may be determined by one drone as the master.

As in the second example described above, it is assumed that there are drones A to G and there is a space where three drones can pass each other in the traveling direction of the drone (refer to FIG. 13).

More specifically, on the basis of the recognition performance of each of the drones, each of the drones is classified into a drone with high recognition performance (high-recognition performance drone) and a drone with low recognition performance (low-recognition performance drone). A high-recognition performance drone is assumed to be a drone capable of recognizing other drones while avoiding other drones. A low-recognition performance drone is assumed to be a drone having no or low ability to recognize other drones while avoiding other drones (that is, during the operation of avoiding another drone, the drone may lose sight of the other drone).

As an example, whether the drone is a high-recognition performance drone or a low-recognition performance drone may be classified in accordance with the number of installed cameras and the installation location. As an example, a drone with only one camera in front of the drone may lose sight of the drone to be avoided during the avoidance operation. Such a drone corresponds to a low-recognition performance drone. On the other hand, the drone in which the camera is installed around, upward and downward, and the like can recognize the drone to be avoided during the avoidance operation. Such a drone corresponds to a high-recognition performance drone.

In addition to the number of cameras installed and the installation location, whether the drone is a high-recognition performance drone or a low-recognition performance drone may be determined on the basis of an angle of view, resolution, or the like. In addition to the recognition performance, interference detection information, flight performance, or the like may be used to determine whether the drone is a high-recognition performance drone or a low-recognition performance drone. For example, a drone with low turning performance is likely to collide because avoidance is not in time, and thus may be classified as a low-recognition performance drone. Furthermore, in the case in which there are seven drones including a certain drone and the number of interference drones recognized using the certain drone is less than six, the certain drone may be set as a low-recognition performance drone.

Here, the drones are classified into two classes of high recognition performance and low recognition performance, but may be classified into three classes of high recognition performance, low recognition performance, and medium recognition performance. Alternatively, they may be classified into four or more classes.

It is assumed that the low-recognition performance drone is caused to fly as it is in the traveling direction without performing an avoidance operation on other drones or is caused to perform a standby operation as an action option. It is assumed that the high-recognition performance drone is caused to fly while performing an avoidance operation on other drones, is caused to fly in the traveling direction without performing an avoidance operation on other drones, or is caused to perform a standby operation as action options. On the basis of such a premise, the priority is adjusted by negotiation between the drones.

Figure 15:
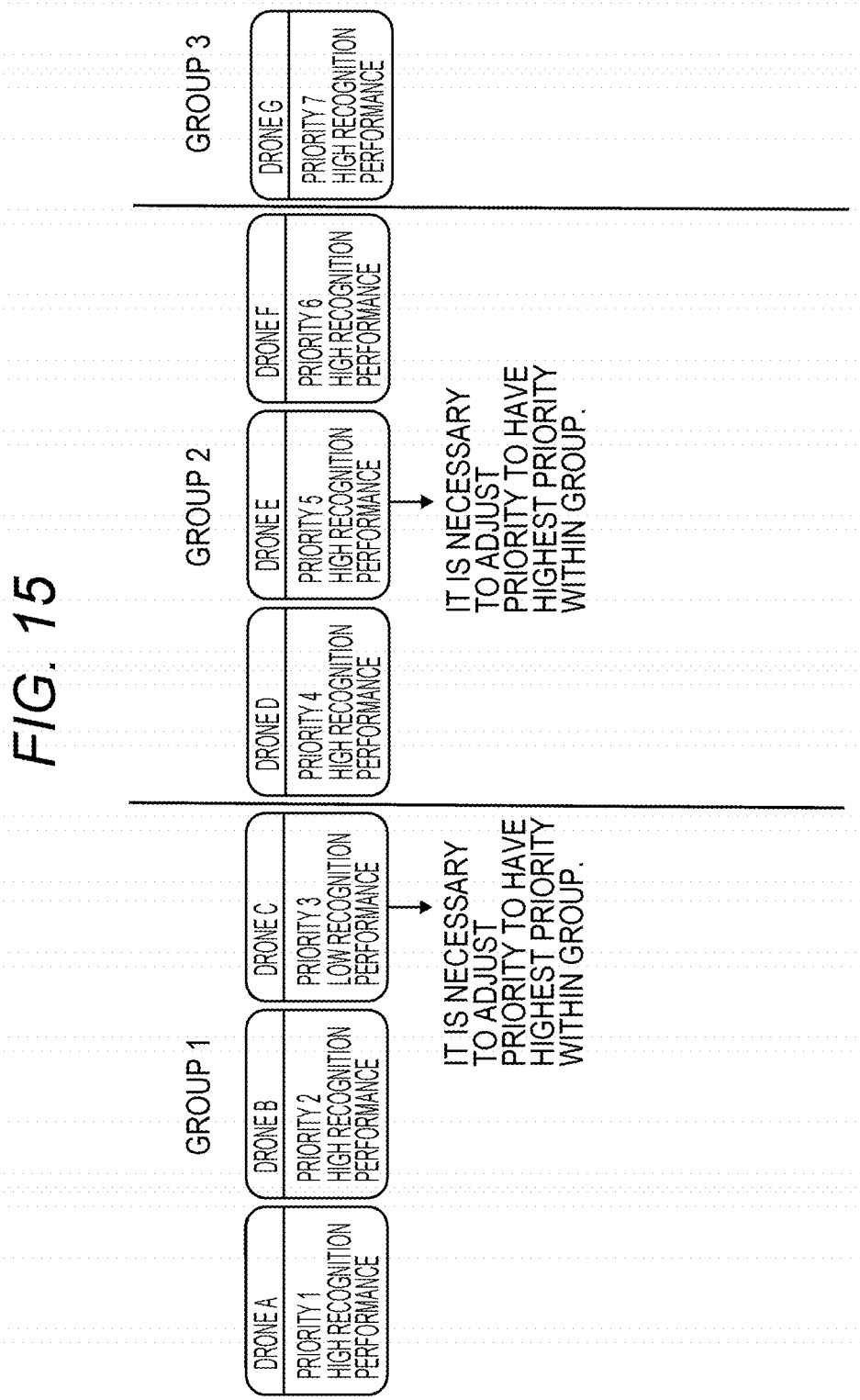
FIG. 15 is a diagram for explaining a specific example of a third example of the collision avoidance control.
Figure 16:
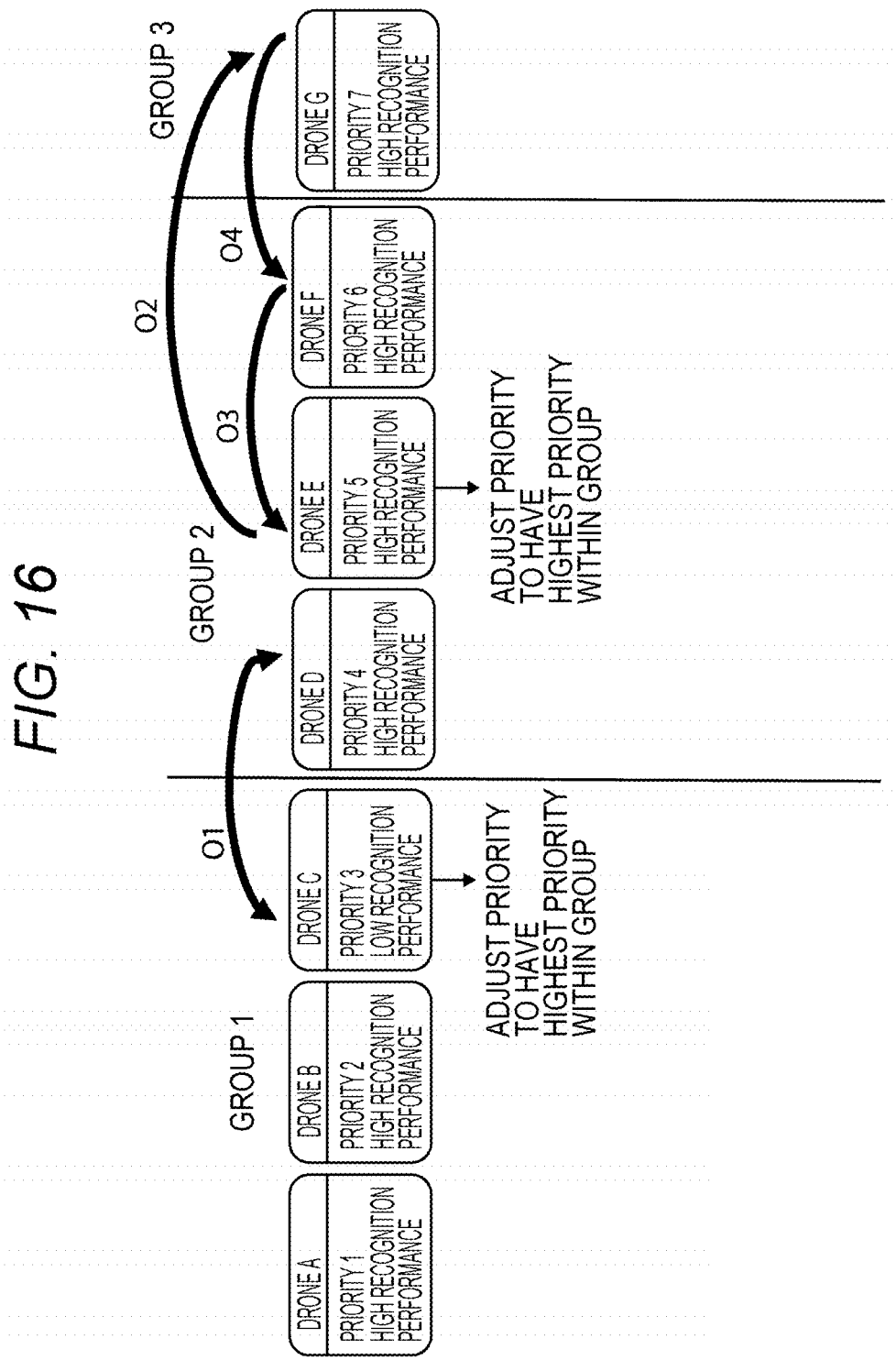
FIG. 16 is a diagram for explaining a specific example of the third example of the collision avoidance control.
Figure 17:
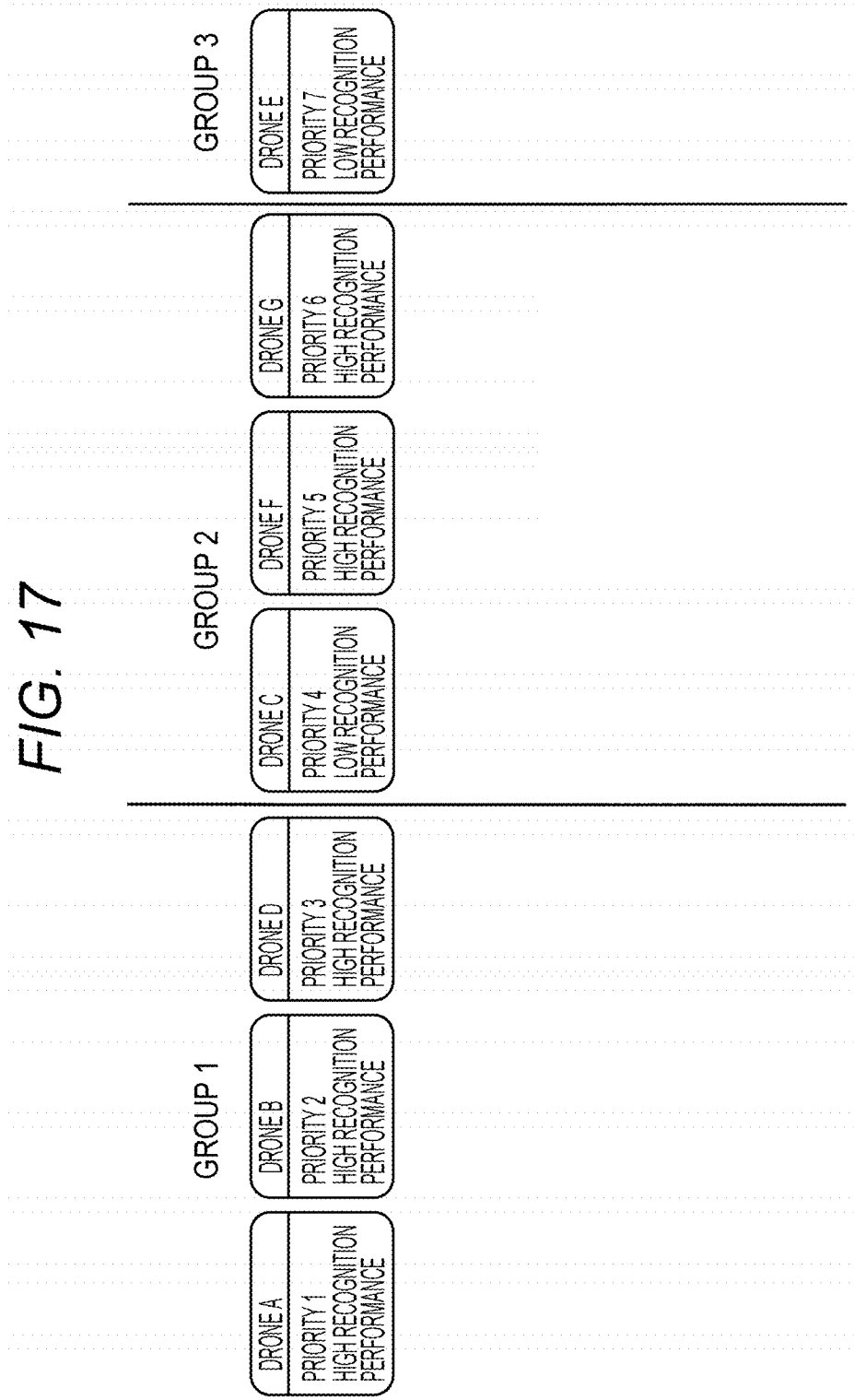
FIG. 17 is a diagram for explaining a specific example of the third example of the collision avoidance control.

FIGS. 15, 16, and 17 are diagrams for explaining a specific example of the third example of the collision avoidance control. In this example, there are seven drones (A, B, C, D, E, F, G). In the traveling direction of the seven drones, there is a space in which the three drones can pass each other.

FIG. 15 shows the pre-adjustment priorities of the 7 drones and the recognition performance (high or low).

As a premise, three drones are grouped as one group in descending order of priority. It is assumed that the groups are selected in descending order of priority, the drone with the highest priority among the three drones in the group does not perform the avoidance operation but travels in the traveling direction as it is, and the remaining two drones perform the avoidance operation. It is assumed that the drone not belonging to the selected group is caused to perform the standby operation.

Under this assumption, under the current priority (priority before adjustment), the first group is drones A, B, and C. The first group is referred to as "Group 1". Since the drone A has the highest priority in Group 1, it is necessary to cause the drone A to travel as it is in the traveling direction without performing the avoidance operation. Although it is necessary to cause the drones B and C having the second and third priorities to perform the avoidance operation, the drone C cannot cause the drone C to perform the avoidance operation because the drone C has low recognition performance. For this reason, it is necessary to adjust the priority of the drone C so that the priority becomes the highest priority in any group, in other words, the drone C can directly travel in the traveling direction without performing the avoidance operation.

Similarly, the second group (referred to as "Group 2") includes drones D, E, and F. Since the drone D has the highest priority in Group 2, it is necessary to cause the drone D to travel in the traveling direction without performing the avoidance operation. Although it is necessary to cause the drones E and F with the second and third priorities to perform the avoidance operation, the drone E cannot cause the drone E to perform the avoidance operation because the drone E has low recognition performance. For this reason, it is necessary to adjust the priority of the drone E so that the priority becomes the highest priority in any group, in other words, the drone E can directly travel in the traveling direction without performing the avoidance operation.

Finally, the drone G remains as the third group (Group 3). Since the drone G has the highest priority, the drone G can travel in the traveling direction as it is without performing the avoidance operation.

FIG. 16 shows an example of an operation procedure for adjusting the priority so that the priority of the drone C and the drone E which need to be adjusted is the highest in either group. In Operation O1, Priority 3 of the drone C and Priority 4 of the drone D are exchanged. In addition, Operation O2 sets the priority of the drone E to the highest Priority 7 in Group 3. Operation O3 increases Priority 6 of the drone F to 5. Operation O4 increases Priority 7 of the drone G to Priority 6.

FIG. 17 illustrates a result of adjusting the priority. The drone C with low recognition performance has the highest priority in Group 2. The priority of the drone E with low recognition performance is the highest priority in Group 3.

Figure 18:
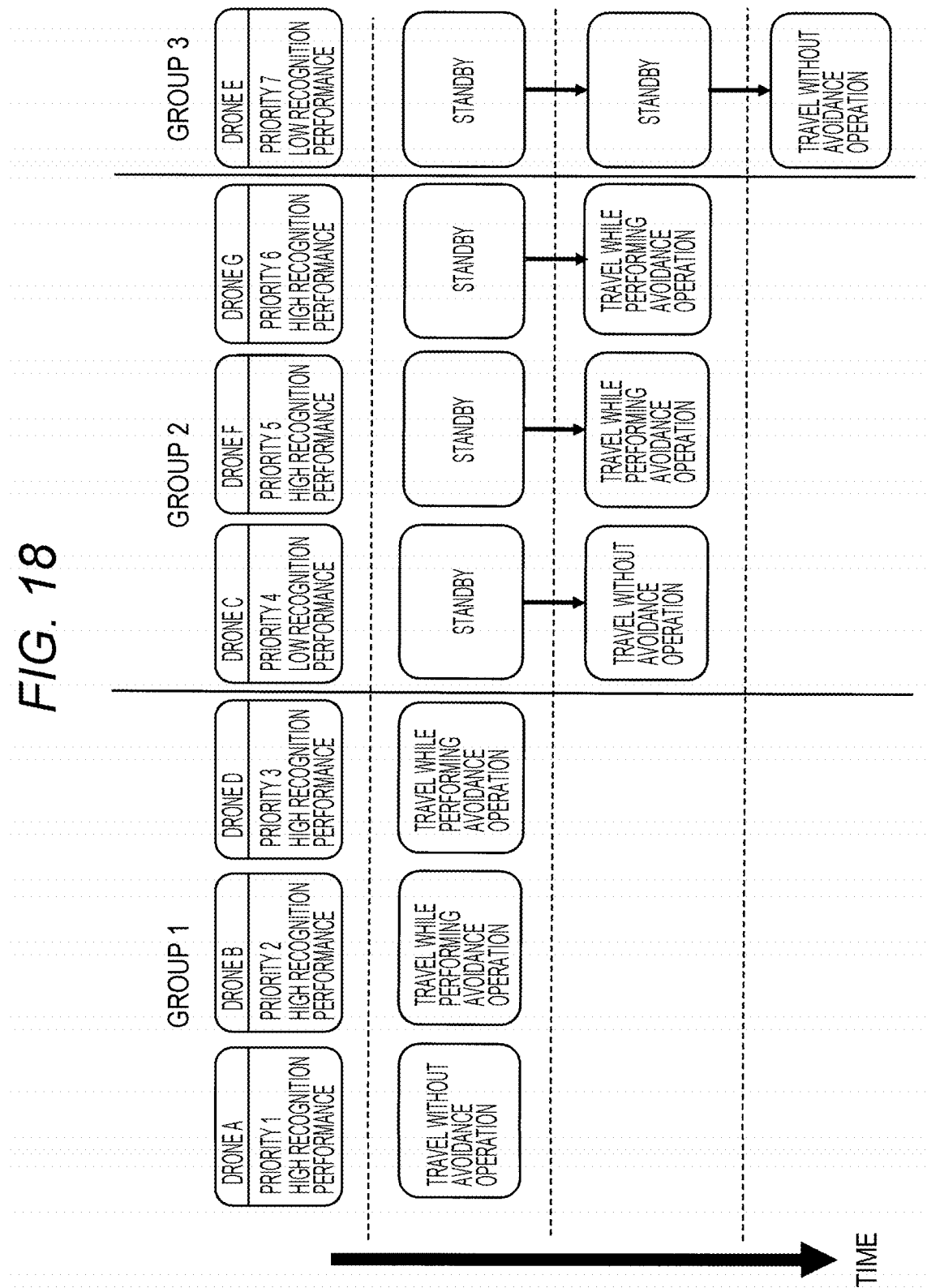
FIG. 18 is a diagram illustrating an example in which each drone is caused to act with an adjusted priority.

FIG. 18 illustrates an example in which each drone is caused to act with the adjusted priority illustrated in FIG. 17. First, Group 1 including the drones A, B, and D is targeted in descending order of priority. The drone A having the highest priority in Group 1 travels without performing the avoidance behavior and the drones B and D travel while performing the avoidance behavior. During the traveling of the drones A, B, and D, the drones C, F, G, and E perform standby operations. If the traveling of the drones A, B, and D is completed, Group 2 including the drones C, F, and G is targeted in descending order of priority. The drone C having the highest priority in Group 2 travels without performing the avoidance behavior and the drones F and G travel while performing the avoidance behavior. During the traveling of the groups C, F, and G, the drone E performs a standby operation. If the traveling of the groups C, F, and G is completed, Group 3 including the drone E is targeted in descending order of the next priority. The drone E having the highest priority in Group 3 travels without performing the avoidance behavior.

Figure 19:
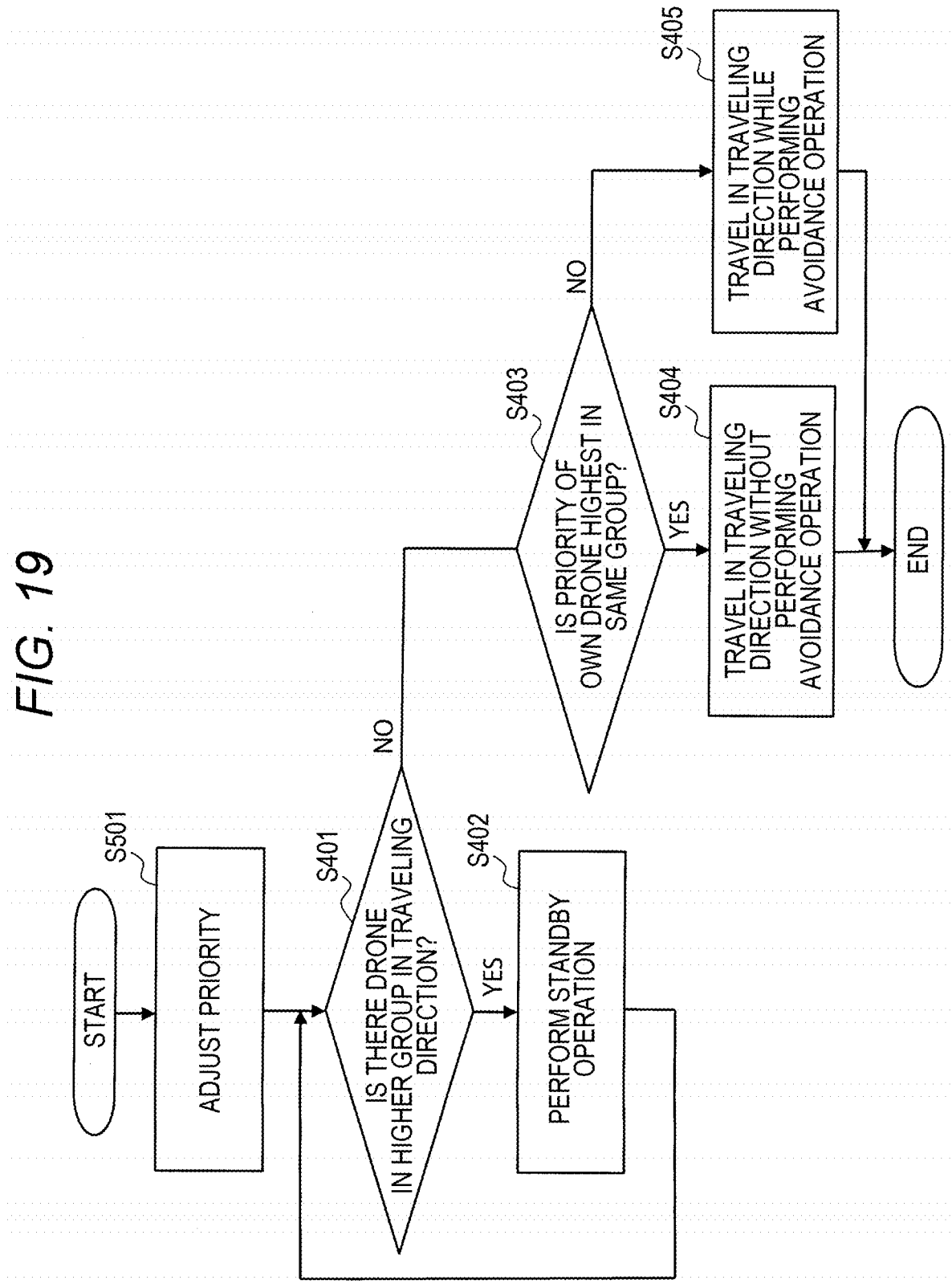
FIG. 19 is a flowchart for describing the third example of the collision avoidance control.

FIG. 19 is a flowchart for describing a third example of the collision avoidance control performed by the control unit 13 of the drone 101. The same description as in FIGS. 12 and 14 will be omitted as appropriate.

The difference from FIG. 14 is that Step S501 of the processing of adjusting the priority is added first. The other steps are the same as those in FIG. 14.

In Step S501, the priority of each drone is adjusted so that the drone with low recognition performance has the highest priority in the group. The priority is adjusted while negotiation is performed between the drones. Alternatively, one drone may serve as a master to adjust the priority of each drone.

As described above, according to the embodiment, the other drone that has entered the course of the own drone is detected on the basis of the image data captured using the drone. A priority of the own drone and the detected drone is determined in accordance with at least one of the recognition performance, the flight performance, the flight purpose, and the like, an action to prevent a collision is determined in accordance with the priority, and the determined action is performed. Examples of the actions include a plurality of types such as traveling along a path without performing an avoidance operation, traveling along a path while performing an avoidance operation, and a standby operation (temporary stop or evacuation to the sky or the like). Therefore, it is possible to determine an appropriate action for preventing the collision in consideration of the recognition performance, the flight performance, the flight purpose, and the like of the own drone and the other drone. In addition, even in the case in which the other drone does not recognize the own drone and cannot communicate with the own drone, the collision can be prevented by determining the priority of the other drone to be a high priority and causing the other drone to fly preferentially.

(Hardware Configuration)

Figure 20:
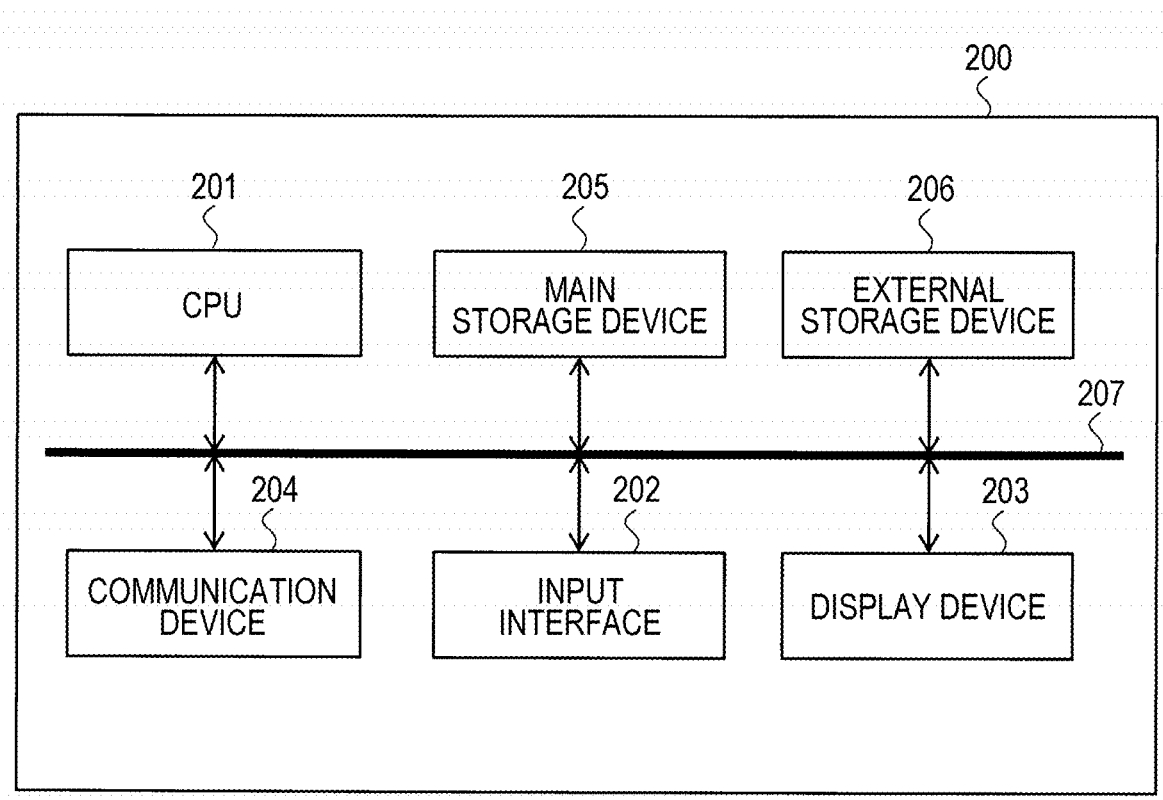
FIG. 20 is a diagram illustrating an example of a hardware configuration of an information processing device or a base station of a drone.

FIG. 20 illustrates an example of a hardware configuration of the drone 101 of FIG. 2 or the base station 201 of FIG. 3. The information processing device 1 of the drone 101 of FIG. 2 or the base station 201 of FIG. 3 includes the computer device 200. The computer device 200 includes a central processing unit (CPU) 201, an input interface 202, a display device 203, a communication device 204, a main storage device 205, and an external storage device 206 which are connected to each other through a bus 207. At least one of these elements may not be included in the information processing device 1 or the base station 201.

The CPU 201 executes a computer program on the main storage device 205. The computer program is a program which realizes each of the above-described functional configurations of the information processing device 1 or the base station 201. The computer program may be realized not by one program but by a combination of a plurality of programs and scripts. Each of the functional configurations is realized using the CPU 201 executing a computer program.

The input interface 202 is a circuit for inputting operation signals from input devices such as a keyboard, a mouse, and a touch panel to the information processing device 1 or the base station 201.

The display device 203 displays the data stored in the information processing device 1 or the base station 201 or the data calculated using the information processing device 1 or the base station 201. The display device 203 is, for example, a liquid crystal display (LCD), an organic electroluminescence display, a cathode ray tube (CRT), or a plasma display (PDP), but is not limited thereto.

The communication device 204 is a circuit for the information processing device 1 or the base station 201 to communicate with an external device in a wireless or wired manner. Data used in the information processing device 1 or the base station 201 can be input from an external device via the communication device 204. The communication device 204 includes an antenna. Data input from an external device can be stored in the main storage device 205 or the external storage device 206.

The main storage device 205 stores a computer program, data necessary for execution of the computer program, data generated by execution of the computer program, and the like. The computer program is developed and executed on the main storage device 205. The main storage device 205 is, for example, a RAM, a DRAM, or an SRAM, but is not limited thereto. The storage unit in FIG. 2 or 3 may be constructed on the main storage device 205.

The external storage device 206 stores a computer program, data necessary for execution of the computer program, data generated by execution of the computer program, and the like. These computer programs and data are read into the main storage device 205 when the computer program is executed. Examples of the external storage device 206 include a hard disk, an optical disk, a flash memory, and a magnetic tape, but are not limited thereto. The storage unit in FIG. 2 or 3 may be constructed on the external storage device 206.

Note that the computer program may be installed in the computer device 200 in advance or may be stored in a storage medium such as a CD-ROM. The computer program may be uploaded on the Internet.

Furthermore, the computer device 200 may be configured as a single device or may be configured as a system including a plurality of computer devices connected to each other.

Second Embodiment

Although the priority is adjusted using the recognition performance (Step S501 in FIG. 19) in the third example of the collision avoidance control in the first embodiment, the priority may be adjusted using other information in addition to the recognition performance or instead of the recognition performance. For example, the priority may be adjusted using the flight purpose.

For example, the priority may be adjusted in the case in which the flight purpose is hindered between the drones. As a specific example, it is assumed that the flight purpose of the drone A is to capture an image of the ground surface and the flight purpose of the drone B is to capture an image of a vehicle traveling on a road. In this case, if the drone A flies while avoiding the drone B, and as a result, the drone B comes below the drone A or the aircraft of the drone A tilts, the imaging by the drone A is hindered. A similar problem occurs also in the case in which the drone B avoids the drone A. In such a case, the priority is adjusted so that the drone A and the drone B can travel without performing the avoidance operation. For example, the drone A and the drone B are set as separate groups and have the highest priority in the group.

As another specific example, it is assumed that the flight purpose of the drone A is to capture an image of the ground surface and the flight purpose of the drone B is to transport a cargo. In this case, the drone A is set to have the highest priority in the group, and in the case in which the drone B is set to the same group as the drone A, the drone B is set to have a priority lower than that of the drone A. As a result, the drone A travels without performing the avoidance operation, and thus imaging is not hindered. Since the drone B is carrying a cargo, there is no problem even if the avoidance operation is performed.

According to the second embodiment, the priority can be adjusted using information other than the recognition performance.

Third Embodiment

When the drone communicates with another drone (interference drone) detected on the basis of the image data to acquire information regarding the other drone, if it takes time to acquire the information, there is a possibility that an action for collision prevention will not be in time and the drone collides with the other drone. Thus, the time until collision with the detected other drone is calculated and the type of information acquired from the other drone may be limited in accordance with the calculated time.

For example, the control unit 13 of the drone 101 calculates the time until the drone collides with the interference drone on the basis of the speed of the own drone, the speed of the interference drone, the distance from the own drone to the interference drone, and the braking performance of the own drone.

As a specific example, the speed of the own drone is 20 m/s and the position of the interference drone is 20 m ahead in the traveling direction of the own drone. The braking performance of the own drone can stop 20 m/s in 1 second. The interference drone temporarily stops for imaging. In this case, the time until collision is one second. If the interference drone is flying in the direction of its own drone, this time is even shorter.

The priority order is set in advance for the type of information to be acquired from the interference drone. For example, priorities are set in the order of [1] position, speed, recognition performance, [2] flight purpose, [3] flight performance, and [4] other. The types of information to be acquired are limited in accordance with time.

As an example, information of [1] in the case in which the time is $\alpha$ or less, information of [1] to [2] in the case in which the time is $\alpha$ or more and less than $\beta$, information of [1] to [3] in the case in which the time is $\beta$ or more and less than $\gamma$, and information of [1] to [4] in the case in which the time is $\gamma$ or more are acquired. The described example is merely an example and other examples may be used. If the number of types of information to be acquired is large, more appropriate priority determination can be performed. Note that the above-described priority order is an example and may be another example.

In the case in which there are two or more interference drones, the time until a collision with each of all of the interference drones is calculated and the time allowed for communication with each of the interference drones is calculated on the basis of the shortest time. Only information of a type corresponding to the calculated time is acquired from each interference drone.

According to the third embodiment, by limiting the information to be acquired in accordance with the time until the collision with the interference drone, it is possible to determine the action until the collision is prevented before the collision with the interference drone.

Fourth Embodiment

Although the priority is mainly determined by negotiation between the drones in the first to third embodiments described above, in a fourth embodiment, a base station 201 determines a priority.

The control unit 52 (refer to FIG. 3) of the base station 201 receives a notification of detection of an interference drone from a drone (referred to as a "drone A") which has detected the interference drone via the communication unit 51. The control unit 52 communicates with the drone A to acquire information regarding the drone A (position, speed, traveling direction, recognition performance, flight purpose, flight performance, interference detection information, and the like). The control unit 52 communicates with an interference drone (referred to as a "drone B") existing at a position indicated by the interference detection information and acquires information regarding the drone B (position, speed, traveling direction, recognition performance, flight purpose, flight performance, interference detection information, and the like).

Similarly to the first to third embodiments, the control unit 52 determines the priorities of the drones A and B and transmits information of the determined priorities to the drone A and the drone B. The information of the priority is information for determining an action for preventing the drones A and B from colliding with each other.

Each of the drone A and the drone B determines an action on the basis of the received priority and performs the determined action. For example, in the case of following the first example of the collision avoidance control of the first embodiment, one of the drones having a high priority advances first in the traveling direction. The other drone waits until the traveling of one of the drones is completed (until one of the drones no longer exists in the traveling direction of the other drone). If the traveling of one of the drones is completed, the other drone starts to travel.

Here, although an example in which there are two drones has been described, the same applies to a case in which there are three or more drones. Similarly, in the case in which a notification of detection of an interference drone is received from two or more drones, the base station 201 acquires information regarding each drone and determines the priority. Thus, information of the determined priority is transmitted to each drone. The collision avoidance control can be performed not only in the first example but also in the second example or the third example.

According to the fourth embodiment, the base station 201 determines the priority so that the calculation load of the drone can be reduced. In addition, since the base station 201 usually has calculation performance higher than that of a drone, the priority can be determined at high speed even if many types of information are used. In addition, in the case in which priorities are determined by negotiation between drones, the amount of communication between the drones increases and control becomes complicated. However, the base station 201 collectively performs processing of determining priorities so that the amount of communication between the drones is reduced and complicated control becomes unnecessary.

Modification 1 of Fourth Embodiment

After the control unit 52 of the base station 201 determines the priority of each drone, the action of each drone is further determined on the basis of the determined priority. The base station 201 transmits data including information of the determined action to each drone. The information of the action is information for determining an action for preventing the drones A and B from colliding with each other.

The action of each drone may be determined similarly to the first to third examples of the collision avoidance control in the first embodiment. Alternatively, as another example, the control unit 52 of the base station 201 may generate a path again in which the drones are allowed to avoid collision with each other. At this time, the drone having the highest priority in the group may use the original path as it is without generating the path again. The base station 201 transmits information of the path generated for each drone to each drone. Each drone flies along a path designated using the base station 201. Such a method is effective not only in the case in which each drone cannot autonomously fly but also in the case in which each drone can autonomously fly.

According to Modification 1, the base station 201 determines the action of each drone so that the calculation load of each drone can be reduced.

Fifth Embodiment

In the above-described fourth embodiment, the base station 201 determines the priority. However, in the fifth embodiment, it is switched whether the base station 201 determines the priority or the drone determines the priority in accordance with the situation of each drone.

As described in the description of the third embodiment described above, if the drone acquires information regarding another drone (interference drone) detected on the basis of image data, if it takes time to acquire the information, there is a possibility that the drone collides with the other drone. Thus, the time until collision with the detected other drone is calculated and it is determined whether the priority is determined using the own drone or the base station 201 in accordance with the calculated time. In the case in which there is time to spare, the base station 201 determines the priority. In this case, more appropriate priority determination can be performed using a large amount of information (for example, all of [1] to [4] described above). In the case in which there is no time to spare, the priority is determined by the own drone. In this case, priority determination is simply performed using limited information (for example, only predetermined information among [1] to [4] described above).

For example, as described in the description of the third embodiment, the control unit 13 of the drone 101 calculates the time until the drone collides with the interference drone on the basis of the speed of the own drone, the speed of the interference drone, the distance from the own drone to the interference drone, and the braking performance of the own drone. In the case in which the time is less than the predetermined value, information regarding the drone 101 is transmitted to the base station 201 and the base station 201 is caused to determine the priority. In the case in which the time is equal to or more than a predetermined value, the drone 101 determines the priority.

The operation in the case in which the base station 201 determines the priority level is similar to that in the fourth embodiment, and thus the description thereof will be omitted. Since the operation in the case in which the drone determines the priority is similar to that of the first to third embodiments, the description thereof will be omitted.

Figure 21:
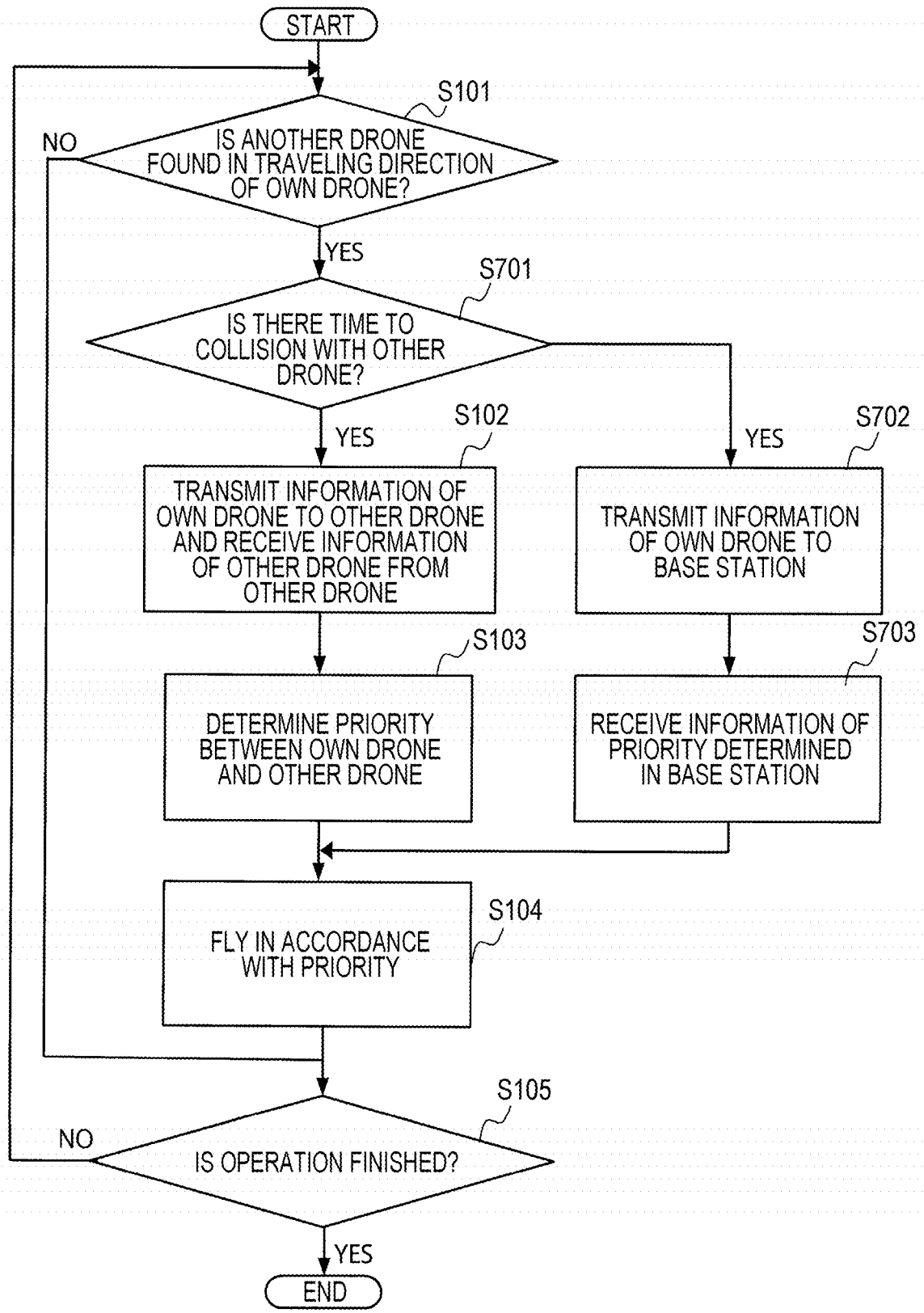
FIG. 21 is a flowchart for describing an example of collision avoidance control in a fifth embodiment.

FIG. 21 is a flowchart for describing an example of collision avoidance control performed by the control unit 13 of the drone in the fifth embodiment. Steps S701 to S703 are additionally illustrated in FIG. 10 used in the first embodiment.

In the case in which another drone is found in the traveling direction, the control unit 13 calculates a time until the drone collides with the other drone. If the calculated time is equal to or longer than the predetermined value, it is determined that there is time to collision (YES in S701) and the process proceeds to the process of step S102. Step S102 and the subsequent steps are the same as those in the first embodiment.

If the calculated time is less than the predetermined value, it is determined that there is no time to collision (NO in S701). The control unit 13 transmits information regarding the own drone to the base station 201 via the communication unit 12 (S702). The control unit 13 receives the information of the priorities of the own drone and the other drone determined by the base station 201 via the communication unit 12 (S703). After that, the process proceeds to the process of Step S104. Step S104 and the subsequent steps are the same as those in the first embodiment.

According to the fifth embodiment, in the case in which there is time to spare before collision with the interference drone, the base station 201 can determine an appropriate priority using a lot of information. In the case in which there is no time to spare, it is possible to simply determine the priority on the basis of limited information between the drones.

Note that the above-described embodiments illustrate examples for embodying the present disclosure, and the present disclosure can be implemented in various other forms. For example, various modifications, substitutions, omissions, or combinations thereof are possible without departing from the gist of the present disclosure. Such modifications, substitutions, omissions, and the like are also included in the scope of the present disclosure and are included in the invention described in the claims and the equivalent scope thereof.

Furthermore, the effects of the present disclosure described in this specification are merely examples, and other effects may be provided.

Note that the present disclosure can also have the following configurations.

[Item 1] An information processing device, including:
an imaging unit which acquires image data by capturing an image of an environment of a moving object;
a control unit which detects another moving object existing in a traveling direction of the moving object on the basis of the image data and performs an action of preventing a collision with the other moving object on the basis of information regarding the other moving object.

[Item 2]
The information processing device according to item 1, in which the control unit determines the action of preventing a collision with the other moving object and performs the action.

[Item 3]
The information processing device according to item 1, in which
the control unit performs, as the action, any one of
traveling while performing an avoidance operation on the other moving object, performing a standby operation, traveling without performing an avoidance operation on the other moving object, and changing a path.

[Item 4] The information processing device according to item 3, in which
the control unit
determines whether the moving object or the other moving object has a priority,
performs, in the case in which the other moving object has a priority, any one of traveling while performing an avoidance operation on the other moving object, performing the standby operation, and changing the path, and in the case in which the moving object has a priority, travels without performing an avoidance operation on the other moving object.

[Item 5] The information processing device according to item 4, in which
the control unit
determines a priority of the moving object and a priority of the other moving object and
determines whether the moving object or the other moving object has a priority on the basis of the priority of the moving object and the priority of the other moving object.

[Item 6] The information processing device according to item 5, in which
the information regarding the other moving object includes recognition performance of an imaging unit of the other moving object and
the control unit determines whether the moving object and the other moving object has a priority on the basis of recognition performance of the imaging unit and the recognition performance of the imaging unit of the other moving object.

[Item 7] The information processing device according to item 6, in which
the imaging unit and the imaging unit of the other moving object include at least one camera, and
the recognition performance of the imaging unit and the recognition performance of the imaging unit of the other moving object are determined on the basis of at least one of
the number of the cameras,
an angle of view of the camera, and
an installation position of the camera,
a resolution of the camera.

[Item 8] The information processing device according to item 6, in which
the recognition performance of the imaging unit is determined on the basis of the number of the other moving objects detected using the control unit, and
recognition performance of an imaging unit of the other moving object is determined on the basis of the number of moving objects recognized by the other moving object in a traveling direction of the other moving object.

[Item 9] The information processing device according to item 4, in which
the control unit
determines whether the other moving object recognizes the moving object; and
prioritizes the other moving object in the case in which it is determined that the other moving object does not recognize the moving object.

[Item 10] The information processing device according to item 4, in which
the information regarding the other moving object includes a movement purpose of the other moving object, and
the control unit determines whether the moving object or the other moving object has a priority on the basis of a movement purpose of the moving object and the movement purpose of the other moving object.

[Item 11] The information processing device according to item 4, in which
the information regarding the other moving object includes movement performance of the other moving object, and
the control unit determines whether the moving object or the other moving object has a priority on the basis of movement performance of the moving object and the movement performance of the other moving object.

[Item 12]
The information processing device according to item 4, in which
the information regarding the other moving object includes a speed of the other moving object, and
the control unit determines whether the moving object or the other moving object has a priority on the basis of a speed of the moving object and the speed of the other moving object.

[Item 13] The information processing device according to item 4, in which
the control unit calculates a time until the moving object collides with the other moving object, and
determines whether the control unit or the base station determines whether the moving object or the other moving object has a priority in accordance with the time, and
in the case in which it is determined that the base station makes the determination and transmits a request for making the determination to the base station.

[Item 14]
The information processing device according to item 1, in which
the control unit
calculates a time until the moving object collides with the other moving object, and
determines a type of the information to be acquired on the basis of the time, and
the information acquisition unit acquires the information of the determined type.

[Item 15]
The information processing device according to item 13, in which
the information regarding the other moving object includes at least one of a position of the other moving object and a distance from the other moving object.

[Item 16] The information processing device according to item 1, in which
the moving object is a flying object.

[Item 17]
A computer program executed by a computer mounted on a moving object, the computer program including:
an imaging step of acquiring image data by capturing an image of an environment including a traveling direction of a moving object;
a detection step of detecting another moving object existing in the traveling direction of the moving object on the basis of the image data; and
a control step of performing an action of preventing a collision with the other moving object on the basis of information regarding the other moving object.

[Item 18]
A method performed by a moving object, the method including:
acquiring image data by capturing an image of an environment including a traveling direction of the moving object;
detecting another moving object existing in the traveling direction of the moving object on the basis of the image data; and
performing an action of preventing a collision with the other moving object on the basis of information regarding the other moving object.

[Item 19]

A communication system including a plurality of moving objects and a base station, in which
each of the plurality of moving objects includes:
an imaging unit which acquires image data by capturing an image of an environment including a traveling direction of the moving object;
a control unit which detects another moving object existing in the traveling direction of the moving object on the basis of the image data; and
a communication unit which communicates with the base station, and the base station includes:
a communication unit which communicates with the moving object;
an information acquisition unit which acquires information of the moving object and the image data from the moving object; and
a control unit which generates information for determining an action of the moving object to prevent a collision with the other moving object on the basis of the information regarding the moving object and the image data and transmits the generated information to the moving object.

REFERENCE SIGNS LIST

1 Information processing device
101, 101A to 101C, A to G Drone
201 Base station
10 Antenna
11 Imaging unit
14A to 14D Rotor
15A to 15D Motor
13 Control unit
12 Communication unit
16 Sensor unit
17 Position detection unit
18 Battery
19 Storage unit
20 Information acquisition unit
31 Image data
41 Space
50 Antenna
51 Communication unit
52 Control unit
53 Storage unit
O1 to O4 Operation
200 Computer device
201 CPU
202 Input interface
203 Display device
204 Communication device
205 Main storage device
206 External storage device
207 Bus

The invention claimed is:

1. An information processing device, comprising:
an imaging unit configured to acquire image data by capturing an image of an environment including a traveling direction of a moving object; and
processing circuitry configured to:
detect another moving object existing in the traveling direction of the moving object on a basis of the image data,
acquire information regarding the other moving object that includes a recognition performance of an imaging unit of the other moving object representing a relative ability to detect moving objects from image data, and
perform an action of preventing a collision with the other moving object on a basis of the information regarding the other moving object that includes the recognition performance of the imaging unit of the other moving object representing the relative ability to detect moving objects from image data.

2. The information processing device according to claim 1, wherein the processing circuitry is configured to determine the action for preventing the collision with the other moving object.

3. The information processing device according to claim 1, wherein the processing circuitry is configured to perform, as the action, any one of:
traveling while performing an avoidance operation on the other moving object,
performing a standby operation,
traveling without performing an avoidance operation on the other moving object, and
changing a path.

4. The information processing device according to claim 3, wherein the processing circuitry is configured to:
determine whether the moving object or the other moving object has priority,
perform, in the case in which the other moving object has priority, any one of the traveling while performing the avoidance operation on the other moving object, the performing the standby operation, and the changing the path, and
perform, in the case in which the moving object has priority, the traveling without performing the avoidance operation on the other moving object.

5. The information processing device according to claim 4, wherein the processing circuitry is configured to:
determine a priority of the moving object and a priority of the other moving object, and
determine whether the moving object or the other moving object has priority on a basis of the priority of the moving object and the priority of the other moving object.

6. The information processing device according to claim 5, wherein the processing circuitry is configured to determine whether the moving object or the other moving object has priority on a basis of a recognition performance of the imaging unit and the recognition performance of the imaging unit of the other moving object.

7. The information processing device according to claim 6, wherein
the imaging unit and the imaging unit of the other moving object each include at least one camera, and
the recognition performance of the imaging unit and the recognition performance of the imaging unit of the other moving object are determined on a basis of at least one of:
a number of the at least one camera,
an angle of view of the at least one camera,
an installation position of the at least one camera, and
a resolution of the at least one camera.

8. The information processing device according to claim 6, wherein
the recognition performance of the imaging unit is determined on a basis of a number of the other moving object detected by the information processing device, and
the recognition performance of the imaging unit of the other moving object is determined on a basis of number of moving objects recognized by the other moving object in a traveling direction of the other moving object.

9. The information processing device according to claim 4, wherein processing circuitry is configured to:
determine that the other moving object does not recognize the moving object, and
prioritize the other moving object in the case in which it is determined that the other moving object does not recognize the moving object.

10. The information processing device according to claim 4, wherein
the information regarding the other moving object includes a movement purpose of the other moving object, and
the processing circuitry is configured to determine whether the moving object or the other moving object has priority on a basis of a movement purpose of the moving object and the movement purpose of the other moving object.

11. The information processing device according to claim 4, wherein
the information regarding the other moving object includes movement performance of the other moving object, and
the processing circuitry is configured to determine whether the moving object or the other moving object has priority on a basis of movement performance of the moving object and the movement performance of the other moving object.

12. The information processing device according to claim 4, wherein
the information regarding the other moving object includes a speed of the other moving object, and
the processing circuitry is configured to determine whether the moving object or the other moving object has priority on a basis of a speed of the moving object and the speed of the other moving object.

13. The information processing device according to claim 4, wherein the processing circuitry is configured to:
calculate a time until the moving object collides with the other moving object,
determine, in accordance with the time, whether the processing circuitry or a base station determines whether the moving object or the other moving object has priority, and
in the case in which it is determined that the base station determines whether the moving object or the other moving object has priority, transmit a request for determining whether the moving object or the other moving object has priority to the base station.

14. The information processing device according to claim 1, wherein the processing circuitry is configured to:
calculate a time until the moving object collides with the other moving object,
determine a type of the information to be acquired on a basis of the time, and
acquire the information of the determined type.

15. The information processing device according to claim 13, wherein the information regarding the other moving object includes at least one of a position of the other moving object or a distance from the other moving object.

16. The information processing device according to claim 1, wherein the moving object is a flying object.

17. A non-transitory computer readable medium storing a program that when executed by a computer mounted on a moving object causes the computer to perform a method, the method comprising:
acquiring image data by capturing an image of an environment including a traveling direction of a moving object;
detecting another moving object existing in the traveling direction of the moving object on a basis of the image data;
acquiring information regarding the other moving object that includes a recognition performance of an imaging unit of the other moving object representing a relative ability to detect moving objects from image data; and
performing an action of preventing a collision with the other moving object on a basis of the information regarding the other moving object that includes the recognition performance of the imaging unit of the other moving object representing the relative ability to detect moving objects from image data.

18. A method performed by a moving object, the method comprising:
acquiring image data by capturing an image of an environment including a traveling direction of the moving object;
detecting another moving object existing in the traveling direction of the moving object on a basis of the image data;
acquiring information regarding the other moving object that includes a recognition performance of an imaging unit of the other moving object representing a relative ability to detect moving objects from image data; and
performing an action of preventing a collision with the other moving object on a basis of the information regarding the other moving object that includes the recognition performance of the imaging unit of the other moving object representing the relative ability to detect moving objects from image data.

19. A communication system, comprising:
a plurality of moving objects; and
a base station, wherein
each of the plurality of moving objects includes:
an imaging unit configured to acquire image data by capturing an image of an environment including a traveling direction of the moving object; and
processing circuitry configured to detect another moving object existing in the traveling direction of the moving object on a basis of the image data and communicate with the base station, and
the base station includes processing circuitry configured to:
communicate with the moving object;
acquire information regarding the moving object, the image data from the moving object, and information regarding the other moving object that includes a recognition performance of an imaging unit of the other moving object representing a relative ability to detect moving objects from image data;
generate information for determining an action of the moving object to prevent a collision with the other moving object on a basis of the information regarding the moving object, the image data, and the information regarding the other moving object that includes the recognition performance of the imaging unit of the other moving object representing the relative ability to detect moving objects from image data; and transmit the generated information to the moving object.

\* \* \* \* \*